US012632429B2

(12) United States Patent
Tian et al.

(10) Patent No.: US 12,632,429 B2
(45) Date of Patent: May 19, 2026

(54) CHARACTERIZING AND FORECASTING EVOLVING QUERY WORKLOADS

(71) Applicant: Microsoft Technology Licensing, LLC, Redmond, WA (US)

(72) Inventors: Yuanyuan Tian, San Jose, CA (US); Hanxian Huang, El Cerrito, CA (US); Rana Alotaibi, Redmond, WA (US); Tarique Ashraf Siddiqui, Redmond, WA (US); Jyoti Leeka, Sunnyvale, CA (US); Jesus Camacho Rodriguez, Sunnyvale, CA (US); Carlo Aldo Curino, Woodinville, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 18/983,339

(22) Filed: Dec. 17, 2024

(65) Prior Publication Data
US 2025/0117372 A1     Apr. 10, 2025

Related U.S. Application Data

(63) Continuation of application No. 18/335,928, filed on Jun. 15, 2023, now Pat. No. 12,197,405.

(60) Provisional application No. 63/499,483, filed on May 1, 2023.

(51) Int. Cl.
*G06F 16/21* (2019.01)
*G06F 16/2455* (2019.01)

(52) U.S. Cl.
CPC ........ *G06F 16/217* (2019.01); *G06F 16/2455* (2019.01)

(58) Field of Classification Search
CPC ........................... G06F 16/217; G06F 16/2455
See application file for complete search history.

(56) References Cited

U.S. PATENT DOCUMENTS

2021/0004675 A1 *  1/2021  Ramesh ................... G06N 3/08
2022/0019585 A1 *  1/2022  Beresniewicz ....... G06F 16/212
2022/0382593 A1 *  12/2022  Tootaghaj ........... G06F 9/45558
2024/0302990 A1 *  9/2024  Zhou ........................ G06N 3/08

OTHER PUBLICATIONS

DBAugur: An Adversarial-based Trend Forecasting System for Diversifi ed Workloads, Yuanning Gao, ISBN (Electronic): 979-8-3503-2227-9, ISSN (Electronic): 2375-026X, Digital object Identifier: 10.1109/ICDE55515.2023.00385, Conference Acronym: ICDE, Publication Date: Apr. 1, 2023 (Year: 2023).*

(Continued)

*Primary Examiner* — Hau H Hoang
(74) *Attorney, Agent, or Firm* — Barta Jones, PLLC

(57) ABSTRACT
Systems and methods for characterizing and forecasting evolving query workloads. The method includes receiving a query, the received query including a parameter value and an arrival time; identifying the query as a recurrent query; extracting a query template from the received query by parsing the received query; based at least on the identifying, generating a feature vector for the received query, the feature vector generated based on the extracted template and the parameter value; and forecasting a future query based on the generated feature vector by applying a neural network.

20 Claims, 13 Drawing Sheets

100

(56)          References Cited

OTHER PUBLICATIONS

LightPro: Lightweight Probabillistic Workload Prediction Frame-
work for Database-as-aService, Xiuqi Huang, 2022 IEEE Interna-
tional Conference on Web Services (ICWS) | 978-1-6654-8143-4/
22/$31.00 ©2022 IEEE | DOI: 10.1109/ICWS55610.2022.00036
(Year: 2022).*
International Preliminary Report on Patentability received for PCT
Application No. PCT/US2024/026123, mailed on Nov. 13, 2025, 8
pages.

* cited by examiner

100

200

400

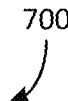
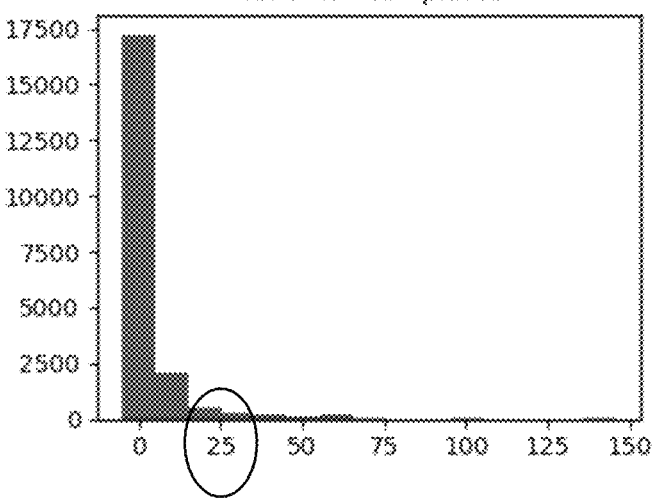
FIG. 7A
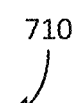
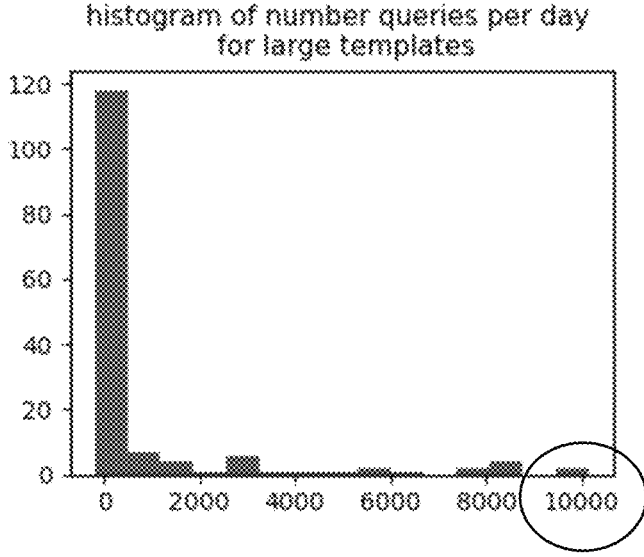
FIG. 7B

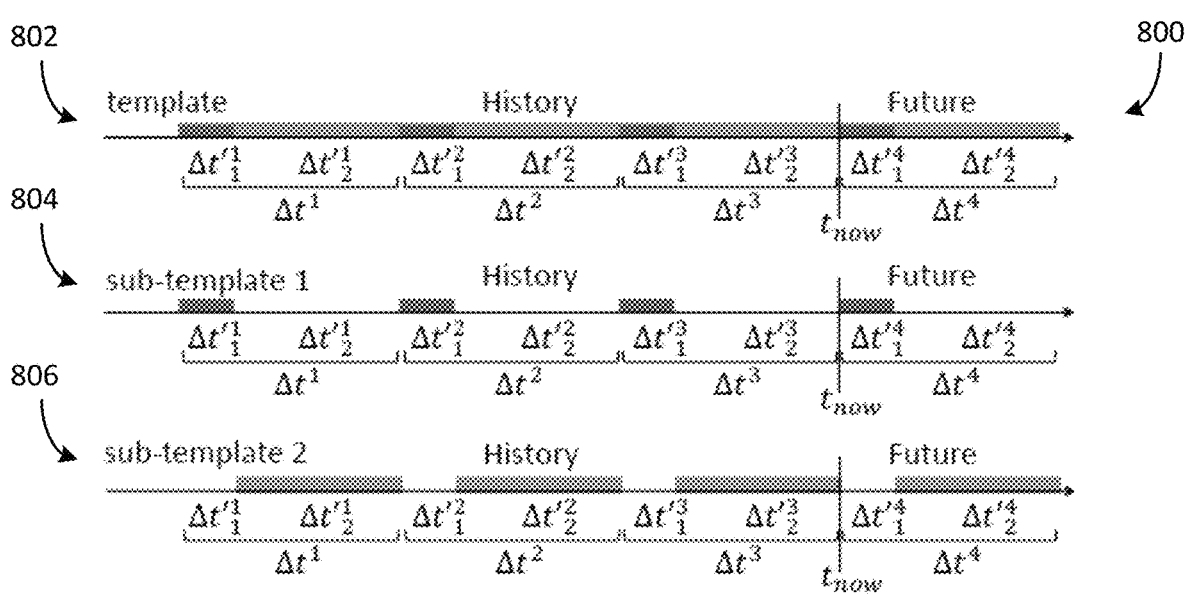

FIG. 8A

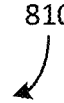

1: Input: $k$; $\tilde{\sigma}_i(\Delta t_j^r)$ and $\tilde{\sigma}_i(\Delta t)$ for template $temp_i$.
2: Initialize the final sub-template set $S = \emptyset$.
3: for $temp_i$ in all templates do
4:     Initialize the sub-template set for $temp_i$: $s_i = \emptyset$
5:     if $\tilde{\sigma}_i(\Delta t) > k$ then
6:        Current_sub_template $C = \emptyset$
7:        Current_remaining_size $R = k$
8:        for $\Delta t_j^r$ in $\Delta t$ do
9:           if $\tilde{\sigma}_i(\Delta t_j^r) \leq R$ then
10:              # fit into the current sub-template
11:              $C = C \cup \{temp_i(\Delta t_j^r)\}$, $R = R - \tilde{\sigma}_i(\Delta t^r)$
12:           else
13:              # initialize a new sub-template
14:              $s_i = s_i \cup \{C\}$
15:              $C = \{temp_i(\Delta t_j^r)\}$, $R = k - \tilde{\sigma}_i(\Delta t_j^r)$
16:     else
17:        $s_i = \{temp_i\}$
18:     $S = S \cup s_i$
19: Output: the final sub-template set $S$

FIG. 8B

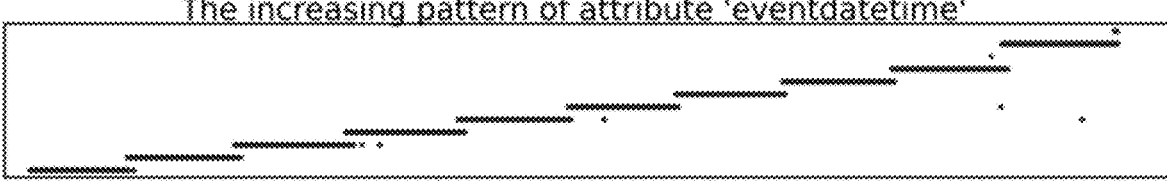
FIG. 10A
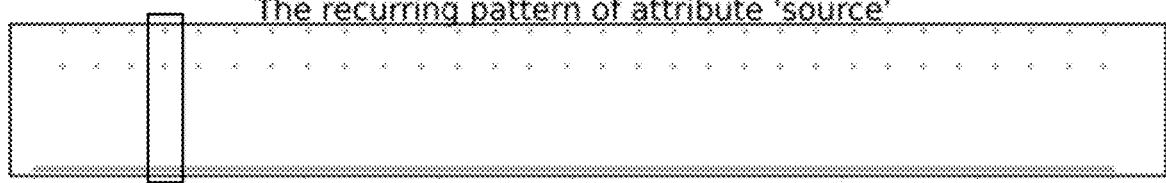
FIG. 10B
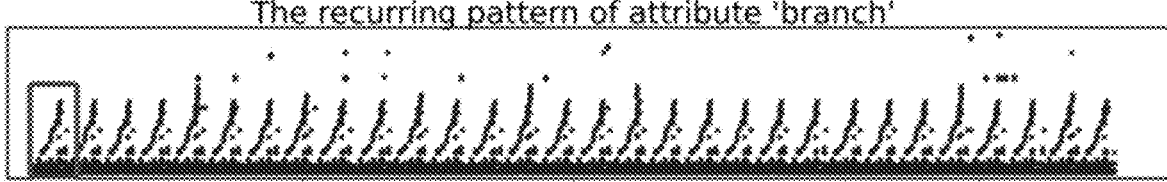
FIG. 10C
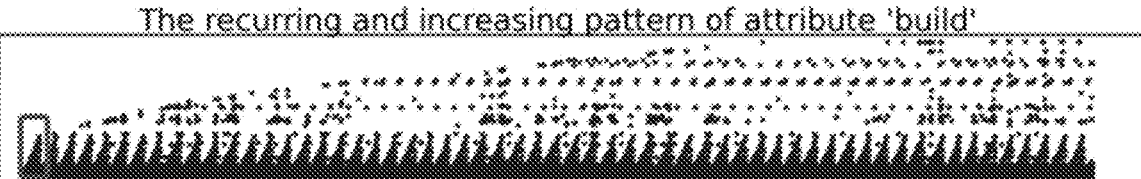
FIG. 10D
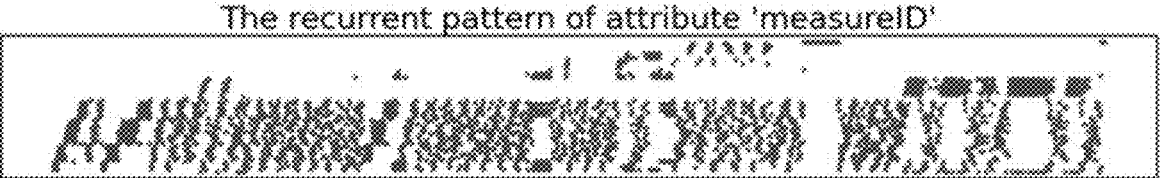
FIG. 10E

```
Query:
SELECT A.x, A.y, SUM(A.e)/SUM(A.z) AS val
FROM A
WHERE A.val1 = 'v1' AND A.val2 = 'v2' AND A.val3 IN (1,2)
GROUP BY A.x, A.y Template:
SELECT A.x,A.y, SUM(A.e) / SUM(A.z) AS val
FROM A
WHERE A.val1 = = $1 AND A.val2 = $2 AND A.val3 IN $3
GROUP BY A.x, A.y Parameters:
('v1', 'v2', (1,2))
```

FIG. 11

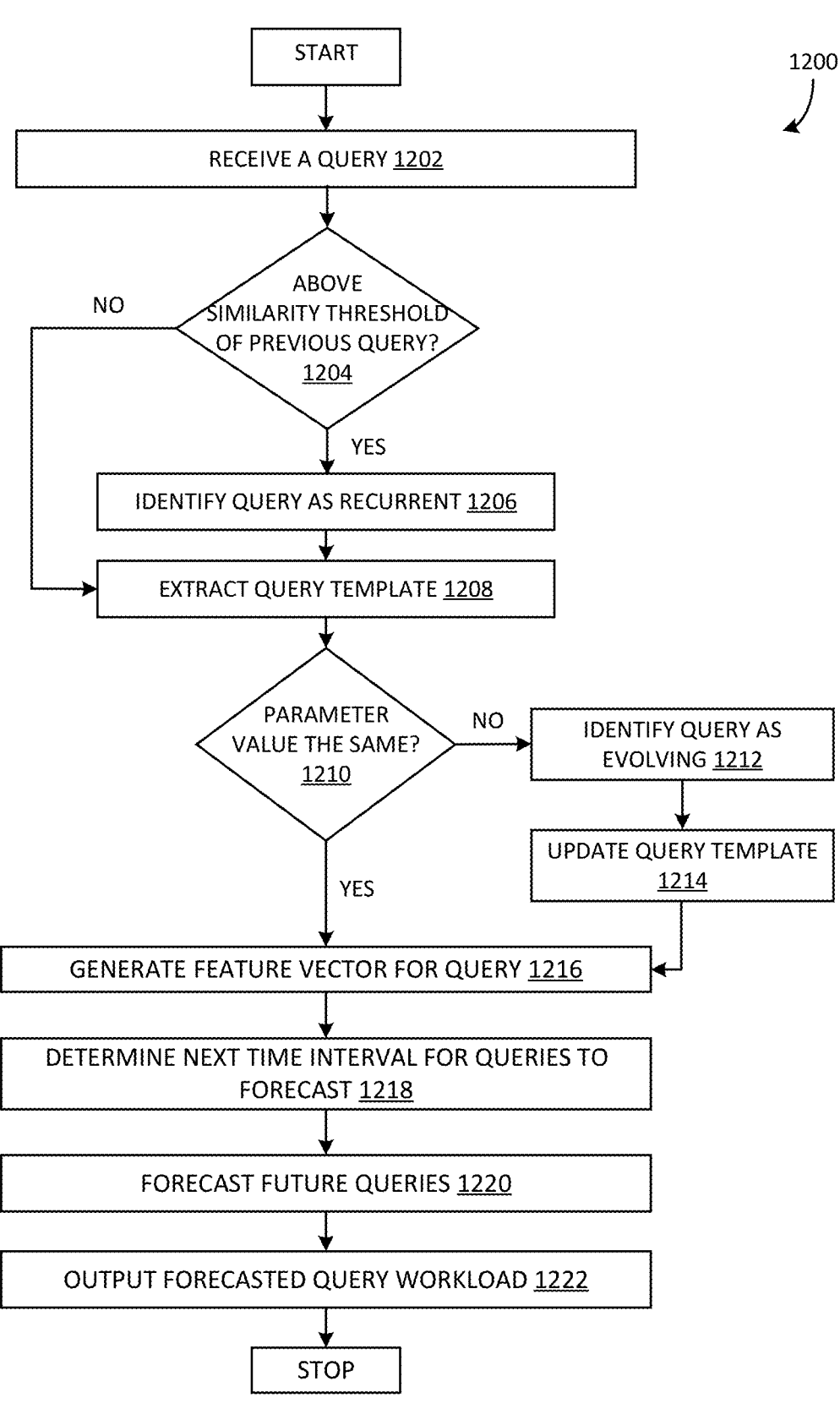

1200

START

RECEIVE A QUERY 1202

ABOVE SIMILARITY THRESHOLD OF PREVIOUS QUERY? 1204

NO

YES

IDENTIFY QUERY AS RECURRENT 1206

EXTRACT QUERY TEMPLATE 1208

PARAMETER VALUE THE SAME? 1210

NO

IDENTIFY QUERY AS EVOLVING 1212

UPDATE QUERY TEMPLATE 1214

YES

GENERATE FEATURE VECTOR FOR QUERY 1216

DETERMINE NEXT TIME INTERVAL FOR QUERIES TO FORECAST 1218

FORECAST FUTURE QUERIES 1220

OUTPUT FORECASTED QUERY WORKLOAD 1222

STOP

FIG. 12

CHARACTERIZING AND FORECASTING EVOLVING QUERY WORKLOADS

CROSS-REFERENCE TO RELATED APPLICATION(S) AND CLAIM OF PRIORITY

This application is a continuation of and claims priority to U.S. Non Provisional patent application Ser. No. 18/335,928 entitled "CHARACTERIZING AND FORECASTING EVOLVING QUERY WORKLOADS" filed on Jun. 15, 2023 which claims priority to Provisional Patent Application No. 63/499,483 entitled "CHARACTERIZING AND FORECASTING EVOLVING QUERY WORKLOADS" filed on May 1, 2023. The above-identified provisional patent application is hereby incorporated by reference in its entirety.

BACKGROUND

Characterizing and forecasting evolving workloads is crucial for various Database Management Systems (DBMS) optimization techniques such as views selection and query results caching. However, it is challenging to precisely capture the time-evolving patterns and forecast exact query workloads, given the increasing complexity of modern data-driven applications. For example, many existing database administrative tools assume that workloads are static, including popular physical design tools provided by commercial database products. These tools automatically recommend physical design features like indexes, materialized views, partitioning schemes, and multi-dimensional clustering (MDC) of tables, based on a workload of queries as input, while considering system constraints like storage budgets. Traditionally, historical query traces have been used as input workloads for these tools. However, since real workloads are dynamic and exhibit time-evolving behavior, recommendations based solely on historical data are not always effective for future workloads. For example, recommended views based on queries with old predicate parameter values may not be useful for future queries if the predicate parameters change over time.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Systems and methods for characterizing and forecasting evolving query workloads are provided. The method includes receiving a query, the received query including a parameter value and an arrival time; identifying the query as a recurrent query; extracting a query template from the received query by parsing the received query; based at least on the identifying, generating a feature vector for the received query, the feature vector generated based on the extracted template and the parameter value; and forecasting a future query based on the generated feature vector.

BRIEF DESCRIPTION OF THE DRAWINGS

The present description will be better understood from the following detailed description read in light of the accompanying drawings, wherein:

FIGS. 7A-7B illustrate examples template volumes for different templates;

FIGS. 8A-8B illustrate an example of template cutting;

FIGS. 10A-10E illustrate example time-evolving patterns and predictability categorization of an internal workload;

FIG. 11 is an example templatization for a query and corresponding template;

FIG. 12 is an example flowchart illustrating a computer-implemented method of forecasting evolving workloads.

Corresponding reference characters indicate corresponding parts throughout the drawings. In FIGS. 1 to 13, the systems are illustrated as schematic drawings. The drawings may not be to scale. Any of the drawings may be combined into a single embodiment or example.

DETAILED DESCRIPTION

Figure 1:
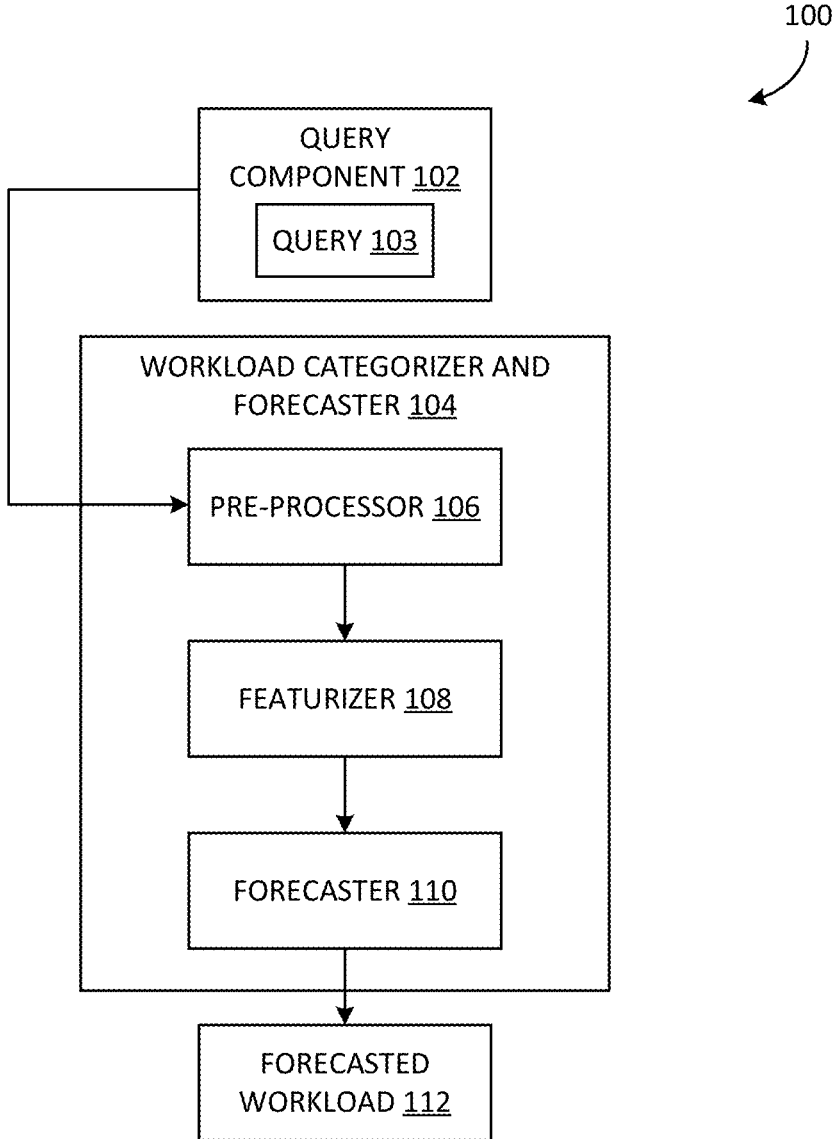
FIG. 1 is a block diagram illustrating an example system for characterizing and forecasting evolving query workloads.

The various implementations and examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

As described herein, characterizing and forecasting evolving workloads is crucial for various DBMS optimization techniques, such as views selection and query results caching. To adapt to evolving workloads, these tools can be enhanced by incorporating predicting capabilities, or alternatively, by using forecasted workloads as input instead of historical workloads. Another area that benefits from workload forecasting is semantic caching, which involves caching query results based on their definitions to accelerate repeated executions. Forecasting the workload can help populate the semantic cache proactively by executing queries before users submit them, thereby improving performance. Auto-scaling, which involves automatically adjusting system resources, such as compute power and storage based on usage, is another category of database administrative tasks. Many existing auto-scaling approaches are reactive, making resource allocation decisions based on immediate historical usage. However, by utilizing the expected usage of forecasted workloads described herein, auto-scaling tools provide proactive auto-scaling.

Further, conventional solutions focus on predicting a next single query or aspects of a next workload without providing a robust, holistic forecast that includes the type of queries that are predicted, content of the query or queries themselves, and a time of the next query or queries. More particularly, some conventional solutions take a current query and recommends next query fragments by predicting fragments separately, then reconstructing them into a query statement. However, this may result in ill-formed or invalid queries and requires additional SQL violation fixing, while also predicting a bin of constants in the future query rather than exact values, which is not sufficiently precise. In other words, this conventional solution predicts a similar future query rather than an exact future query. Other conventional solutions predict an arrival rate of future query workload by learning on the historical arrival rate pattern, only forecast the shifts of the workload, or learn the vector representation for query plans to perform workload summarization and query classification, which only captures the syntax similarity among queries but fails to predict the literals in queries. Each of these conventional solutions fail to precisely predict future query workloads and the content or parameters of the future queries.

Examples of the present disclosure provide systems and methods that categorize evolving workloads and forecasts exact future query workloads, including their arrival time and the entire query statements, based at least on historical workload traces. A framework described herein (e.g., a workload categorizer and forecaster 104 described with reference to FIG. 1) analyzes real workloads quantitatively and qualitatively, summarizing their time-evolving characteristics, and observes the recurrence of query templates and the predictability of query-based workloads. Based on these observations, template-based featurization is implemented for the queries and a deep learning model is introduced to forecast multiple future queries, and their forecast parameters, with their expected arrival time for each template. To optimize capacity of the deep learning model, the framework utilizes a cut and pack technique on the templates according to the trace length of each template and the prediction window size of the deep learning models, reducing the number of models to train and maintain while also significantly improving the time and storage efficiency compared to conventional systems and methods. Accordingly, the present disclosure provides a holistic future workload forecasting technique for improving applications in DBMS. Entire query statements, as well as the query arrival time, for a sequence of queries within a defined time span is forecasted. Predicting all future queries that will arrive within the next view selection interval enables a view selection algorithm to proactively adapt to the evolving workload and optimize performance.

Thus, the present disclosure provides a holistic framework, e.g., a workload categorizing and forecasting framework, that effectively characterizes and forecasts evolving workloads to improve DBMS workload-dependent optimization techniques for a time series of queries to appear in a future workload. The framework utilizes a template-based representation to encode query statements and arrival time as a feature map, which is used for training and testing machine learning (ML) models. The framework employs an encoder-decoder framework in combination with a ML model to learn and predict future query templates, constants in the templates, and query arrival time. Additionally, the framework introduces the cut and pack technique to cluster templates and train one ML model for each cluster, optimizing model capacity, prediction time, and storage efficiency.

The framework addresses an inherently technical problem of accurately and efficiently predicting future query workloads and provides a technical solution by identifying and solving the future queries forecasting challenge for a time-evolving workload, which improves DBMS workload-optimization. For example, the framework learns and forecasts the entire statements of future recurrent queries in various time spans with a corresponding arrival time. The framework operates in an unconventional manner by employing a template-based featurization approach to reuse recurrent templates, simplifying the forecasting challenge compared to other methods, such as token-based featurization methods. In some examples, the framework only uses recurring templates and does not use templates that are not recurring. As used herein, query is a recurrent query in a workload if the query shares a same query template with at least another query in the workload and a recurring template is a template that has more than one query in the workload. As such, the framework further generates well-formed query statements and is more efficient than existing solutions, enabling at least 13.8 times smaller storage overhead compared to traditional bit-vector representation. The framework includes an encoder-decoder architecture for time-series learning and multi-query prediction approach. This improves scalability by reducing the number of encoder-decoder models to train for each workload using the template cut and pack technique, resulting in significant time and storage efficiency improvements. The framework further includes a feedback loop to handle workload shifts and new emerging templates. This leverages incremental learning to efficiently adapt the pre-trained encoder-decoder architecture onto shifted workloads.

As referenced herein, a query q is a statement written in structured query language (SQL), SCOPE query language, or similar query languages. A query includes, but is not limited to, one or more of the following: a request, data or information from a database table, an insert, delete, or update statement, and so forth. As referenced herein, a parameterized query is a query that utilizes parameters to enhance both the flexibility and security of the query. A parameterized query separates the query logic from the parameters, with the query logic referred to as the query template. Within the query template, placeholders are included for parameters. In some examples, a normally written query is rewritten into a parameterized query by extracting the constant values used in the query as parameters. For a query q, temp(q) is denoted as the template of q, and para(q) as the sequence of parameter values of q. For example, the query "SELECT * FROM event WHERE event_time>='Jan. 22, 2023' AND event_time<='Jan. 29, 2023'" can be rewritten as a parameterized query with "SELECT * FROM event WHERE event_time>=\$1 AND event_time<\$2" as the template, and ('Jan. 22, 2023', 'Jan. 29, 2023') as the parameter values.

The present disclosure utilizes an expected arrival time of each query as a component of the forecasting task. The expected arrival time not only determines the ordering of the predicted queries, but also constrains the forecast for a next-$\Delta t$ prediction challenge described herein, and improves the optimal allocation of resources.

As reference herein, a workload W is a time series of queries, $W=[(q1, tq1), (q2, tq2), \ldots, (qn, tqn)]$, where each query qi in the workload has an associated arrival time qi indicating when the query is issued and the queries in the workload are ordered by their arrival time, i.e. $tq1 \leq tq2 \leq \ldots \leq tqn$. The present disclosure contemplates two workload forecasting approaches, a next-k forecasting approach and a next-$\Delta t$ forecasting approach. In the next-k forecasting approach, which utilizes number-based windows, given a workload $W=[(q1, tq1), (q2, tq2), \ldots, (qn, tqn)]$, the next-k forecasting approach predicts the next k future queries as: $Fk(W)=[(qn+1, tqn+1), (qn+2, tqn+2), \ldots, (qn+k, tqn+k)]$. As referenced herein, k is any number of future queries within computational limitations that can be predicted. In contrast, in a next-$\Delta t$ forecasting approach, which utilizes time-based windows, given a workload $W=[(q1, tq1), (q2, tq2), \ldots, (qn, tqn)]$, the next-$\Delta t$ forecasting approach predicts the queries in the next time interval of size $\Delta t$: $F\omega(W)=[(qn+1, tqn+1), (qn+2, tqn+2), \ldots, (qn+m, tqn+m)]$ where $tqn+m<tqn+\Delta t \leq tqn+m+1$. In the next-$\Delta t$ forecasting approach, the number of queries to predict is unknown in advance and is determined based on the arrival time of the predicted queries. As referenced herein, $\Delta t$ is a timeframe for which queries are predicted, such as one hour, one day, one week, and the like.

Operationally, queries are predicted until a query with an arrival time exceeding the next-$\Delta t$ time interval is identified, which enables the next-$\Delta t$ forecasting approach to be more practical for real-world applications than other conventional methods. For example, database administrative tasks, such as selecting materialized views and adjusting the allocated resources on a cloud, are typically performed at regular intervals, such as hourly, daily, or weekly. Therefore, the knowledge of the expected workload in the target time interval is used for optimizing database performance and resource utilization. The framework used for characterizing and forecasting evolving query workloads described herein is used for the next-$\Delta t$ forecasting approach.

FIG. 1 is a block diagram illustrating a system 100 for characterizing and forecasting evolving query workloads. The system 100 illustrated in FIG. 1 is provided for illustration only. Other examples of the system 100 can be used without departing from the scope of the present disclosure.

The system 100 includes a workload categorizer and forecaster 104. The workload categorizer and forecaster 104 is a special-purpose workload forecasting framework applicable for a variety of use cases. In examples involving a general-purpose computer, aspects of the disclosure transform the general-purpose computer into a special-purpose computing device when configured to execute the instructions described herein. The workload categorizer and forecaster 104 takes past query traces and predicts future query traces. The workload categorizer and forecaster 104 utilizes machine learning models to perform one or more time series predictions. The forecasted future queries with their arrival time can then be fed into existing database administrative tools that expect a workload as input for various database optimization and tuning tasks. In some examples, the workload categorizer and forecaster 104 operates in three phases, an offline training phase, an online forecasting phase, and a fine-tuning phase. In the offline training phase, the workload categorizer and forecaster 104 featurizes queries 103 and their arrival time in the historical workload and trains a set of ML models. In the online forecasting phase, the workload categorizer and forecaster 104 receives queries 103 from the workload traces and employs the trained ML models to predict the next-k or next-$\Delta t$ queries with their expected arrival time in the future workload. The fine-tuning phase includes a feedback loop to monitor the forecasting accuracy of the ML models and detect the workload shifts, e.g., new types of queries emerging in the workload. Based at least on received feedback, the workload categorizer and forecaster 104 adjusts and fine-tunes the ML models to compensate for workload shifts. The workload categorizer and forecaster 104 enables the predictions of future query sequences, parameters, and arrival times, and supports the capture of time-evolving characteristics, supports varying forecasting horizons, supports forecasting future query statements, supports well-formed and exact query statements, and supports forecasting precise query constraints.

It should be understood that, as with any application of ML models, the more training data that is available, the more accurate predictions can become. Therefore, the historical workload provides a threshold amount (e.g., an amount that provides a particular degree of accuracy) of training examples for the next-k or next-$\Delta t$ forecasting tasks. In addition, the parameters k and $\Delta t$ are not arbitrarily chosen in some examples due to, for example, computational constraints and the limitations of a particular ML models' capacity. For example, predicting an entire workload for an upcoming week may not be practical or computationally feasible. As such, the workload categorizer and forecaster 104 breaks a larger task that may span a week's time (e.g., a seven day forecast), down into seven next-day forecasting tasks, instead of the full seven day forecast. In this example, after each day, the previous day's query data is used to fine-tune the models and generate more accurate predictions for the following day's workload.

Further, in some examples, the training of the ML models is performed using deep learning classification algorithms and/or other machine learning techniques. In some examples, a forecaster 110, shown in FIG. 1, includes a machine learning module that comprises a trained regressor such as a random decision forest, a directed acyclic graph, a support vector machine, a convolutional neural network or other neural network, or another trained regressor. Such a trained regressor may be trained using the training data (e.g., observations from real workloads) as feedback data. It should further be understood that the machine learning module, in some examples, operates according to machine learning principles and/or techniques known in the art without departing from the systems and/or methods described herein.

In an example, the machine learning module of the forecaster 110 makes use of training data pairs when applying machine learning techniques and/or algorithms. Millions of training data pairs (or more) may be stored in a machine learning data structure. In some examples, a training data pair includes a timestamp-based feedback data value paired with an interval adjustment value. The pairing of the two values demonstrates a relationship between the feedback data value and the adjustment values that may be used by the machine learning module to determine future interval adjustments according to machine learning techniques and/or algorithms.

The workload categorizer and forecaster 104 is trained based on observations from real workloads, as described herein. The real workloads comprise one or more of the following: historical data from historical query trace data for products and services, historical query data from an internal decision support system, historical production job queries executed in an internal cloud data service, and historical query data from a mobile application. The historical query trace data for products and services can include workloads of queries on purchase, sales, budget, and forecast data, including a comprehensive view of transactional details. The historical query data from an internal decision support system is, for example, data from queries of telemetry data of products and services, which compute aggregate statistics on device telemetry filtered by a version, operating system (OS) build, etc. The historical production job queries include production jobs executed in a query engine that is, in some examples, an internal cloud data service. These jobs include big data analytical queries written in a query language, such as the SCOPE query language, and may include user defined functions (UDFs) and/or user defined objects (UDOs). The historical query data from a mobile application includes workloads of queries for live tracking on a public system, such as a public transit bus system. These queries are issued to help users find nearby busy stops and obtain route information. In some examples, the workload traces are open sourced.

Tables 1-4 below include exemplary real workloads with trace length in days. For example, Table 1 includes basic statistics of workloads (e.g., WL1-WL4) with the trace length ranging from 14 days to 57 days, and a number of queries ranging from 13,300 queries to 25 million queries. Table 2 includes recurrent queries in the workloads with a percentage of recurrent queries ranging from 94.5% to 99.9%, and a number of recurrent templates ranging from 258 templates to 168,197 templates. Table 3 includes time-evolving queries in the workloads with a percentage of evolving templates ranging from 0.2% to 99.8%, and a percentage of evolving queries ranging from 26.6% to 99.9%. Table 4 includes the predictability of the workloads ranging from 85.1% to 92.4%. Thus, the workload categorizer and forecaster 104 recognizes, based on the historical query data, that queries in real workloads shown in the Tables 1-4 are highly recurrent, that recurrent queries can evolve over time, and recurrent queries exhibit a high level of predictability.

TABLE 1

The basic statistics of the workloads

|  | WL1 | WL2 | WL3 | WL4 |
|---|---|---|---|---|
| Trace length (days) | 14 | 14 | 57 | 32 |
| # queries | 2.6M | 6M | 25M | 13.3K |

TABLE 2

Recurrent queries in the workloads

|  | WL1 | WL2 | WL3 | WL4 |
|---|---|---|---|---|
| % recurrent queries | 99.9% | 94.5% | 99.9% | 96.9% |
| # recurrent templates | 2,157 | 168,197 | 258 | 1,143 |

TABLE 3

Time-evolving queries in the workloads

|  | WL1 | WL2 | WL3 | WL4 |
|---|---|---|---|---|
| % evolving templates | 96.6% | 97.3% | 99.8% | 0.2% |
| % evolving queries | 99.9% | 99.4% | 99.9% | 26.6% |

TABLE 4

The predictability of workloads

|  | WL1 | WL2 | WL3 | WL4 |
|---|---|---|---|---|
| Trivial-to-predict | 21.3% | 23.1% | 13.7% | 9.1% |
| Predictable-by-model | 68.5% | 62.0% | 78.7% | 81.8% |
| Unpredictable | 10.3% | 14.9% | 7.6% | 9.1% |
| Total predictable | 89.7% | 85.1% | 92.4% | 90.9% |

With reference back to FIG. 1, the workload categorizer and forecaster 104 includes a pre-processor 106, the featurizer 108, and the forecaster 110. Each of the pre-processor 106, the featurizer 108, and the forecaster 110 are examples of special-purpose processing units implemented on a processor that perform specialized functions. The workload categorizer and forecaster 104 implements the pre-processor 106, the featurizer 108, and the forecaster 110 to address both the next-k and the next-Δt forecasting approaches, as described herein. The workload categorizer and forecaster 104 addresses challenges and/or limitations from conventional solutions that construct a single global model, which include, for example, actual workloads frequently including different types of queries that make it difficult to featurize an extensive range of query logic, a large number of features that a single global model needs to learn, and necessitating a substantial amount of training data that is expensive to accumulate, organize, and train. In some examples, the workload categorizer and forecaster 104 generates multiple models for different workloads that operate in a per-template approach that simplifies the feature engineering, model training, model prediction, and model fine-tuning process while providing better prediction accuracy. For example, the workload categorizer and forecaster 104 generates an ML model for each template, referred to as the per-template model or approach, that takes into account that real-workload queries are highly templatized and the query parameters in each template frequently exhibit time-evolving patterns and are generally predictable.

The pre-processor 106 receives queries 103, or query traces, from query component 102 (e.g., a query database) and groups queries 103 in a workload based on query templates. The pre-processor 106 extracts a query template from each query 103 by parsing the query 103 to create an abstract syntax tree (AST) and transforms literals in the AST into parameter markers. The pre-processor 106 ascertains an equivalence of query templates by evaluating whether respective ASTs are identical and then associates all parameter bindings in queries that map to the same query template with that same template. In some examples, the pre-processor 106 utilizes canonical representation of filter predicates to evaluate query template equivalence.

The featurizer 108 featurizes, or creates a feature representation, the received queries 103 and their respective arrival times in a manner that satisfies conditions, such as to capture complex query structures that extend beyond simple selection, projection, join, group-by, and aggregation; to encode one or both of the query arrival time or other query parameter values of the date-time type that captures the periodicity and seasonality of time; and to capture the relationship between consecutive queries 103. Encoding one or both of the query arrival time and other query parameter values of the date-time type captures the periodicity, such as a year, month, week, day, and the like, and seasonality, such as weekdays, weekends, seasons of the year, holidays, and the like, of time. Encoding further captures complex query structures that extend beyond simple selection, projection, join, group-by, and aggregation recognizes that some workloads include additional query structures such as user-defined functions (UDFs), user-defined objects (UDOs), common table expressions (CTEs), and intricate selection predicates such as IN clauses. Conventional solutions typically support only limited query complexity, such as select-project-join (SPJ) queries, or encode each word in a query statement as a token from a corpus vocabulary. However, this poses an additional challenge of predicting all tokens in the query statement in the correct SQL syntax. The featurizer 108 leverages the query templates, grouped by the pre-processor 106, to address this by using template identification (ID) to capture the query structure while hiding the query complexity within the template. Each query 103 is then featurized within the template ID and parameter values, providing computational and storage efficiency while simplifying the query reconstruction process by filling in parameter values into the corresponding template to reconstruct a predicted query.

The featurizer 108 generates a query feature vector that includes encoded parameter values and encoded differences between the parameter values of the current query and its predecessor to account for potential dependencies of previous queries in a time series. To do so, the featurizer 108 utilizes a table schema and parameter values to deduce data types of parameters, and then encodes each parameter according to its corresponding data type. For example, for a query "select * from T where T.a>13", the template is "select * from T where T.a>$1" and the parameters is "$1=13". The table schema tells the datatype for each column in a table. In this case, for example, the table schema tells us that column "a" in table "T" is of type "Int". As such, it is highly likely that parameter $1 is of type "Int". In addition, the actually parameter value of this query is 13 which further helps infer that parameter $1 is of type "Int".

Data types include, but are not limited to, numerical types, categorical types, data-time types, and list types. For numerical types, such as Int, Long, Double, and Float, the featurizer 108 encodes the parameters by their numerical values. For categorical types, such as String, Char, and Boolean, the featurizer 108 encodes the parameters as categorical values. For each parameter, the featurizer 108 collects all possible values from the training data and assigns an integer value to each category. For data-time types, the featurizer 108 dissects the value of time-date into individual components such as year, month, day, hour, minute, and second. The featurizer 108 further incorporates additional, derived features such as identification of weekends or public holidays, season of the year, and so forth in generating the feature vector. For list types, the list parameters often appear in the IN or VALUES clause in a query. In some examples, the featurizer 108 encodes the parameters similarly to categorical types, as some fixed combinations of values are recurrent.

In some examples, the featurizer 108 further generates an arrival time feature vector for each current query and its predecessor. The featurizer 108 decomposes the query arrival time into constituent parts, including year, month, day, hour, minute, and second, enabling the ML models to forecast all features related to time and accurately reconstruct future arrival timestamps, as well as featurize the difference between the arrival time of successive queries.

In some examples, the featurizer 108 further generates an input feature map including a sequence of feature vectors sequenced up to a current timestamp fv1, fv2, . . . , fvn. Each feature vector fvi comprises the query feature vector concatenated with the corresponding query arrival time feature vector. The output of the ML models is a sequence of the next-k feature vectors (fvn+1, fvn+2, . . . , fvn+k), which are then used to reconstruct the next-k queries with their respective arrival times. The input feature map enables the inter-relationship among features within and between queries to be captured, allowing the ML models to learn from these connections and continuously improve the generated predictions, or forecasts.

The forecaster 110 includes one or more ML models that are used singularly or in combination with forecast query workloads that address one or both of the next-k forecasting challenge and the next-$\Delta t$ forecasting challenge. The forecaster 110 is described in greater detail below in the description of FIG. 2. For example, the forecaster 228 illustrated in FIG. 2. is an example of the forecaster 110. The output of the forecaster 110 is a forecasted workload 112 that includes a forecasted future query, or queries, and their respective arrival time.

Figure 2:
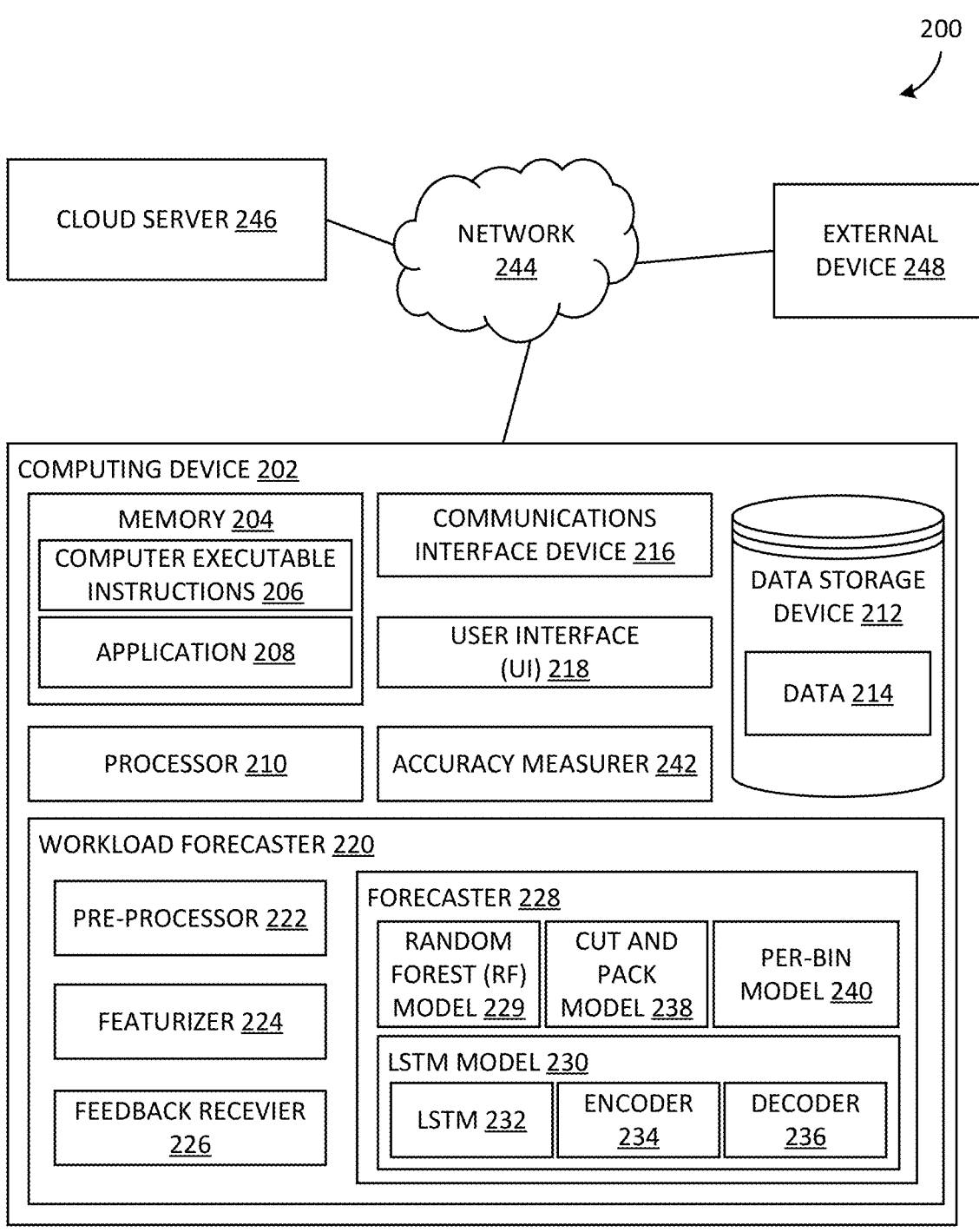
FIG. 2 is a block diagram illustrating an example system for characterizing and forecasting evolving query workloads.

FIG. 2 is a block diagram illustrating an example system 200 for characterizing and forecasting evolving query workloads. The system 200 illustrated in FIG. 2 is provided for illustration only. Other examples of the system 200 can be used without departing from the scope of the present disclosure.

The system 200 includes a computing device 202, a cloud server 246, and an external device 248. Each of the computing device 202, the cloud server 246, and the external device 248 are communicatively coupled to and communicate via a network 244. The computing device 202 represents any device executing computer-executable instructions 206 (e.g., as application programs, operating system functionality, or both) to implement the operations and functionality associated with the computing device 202. The computing device 202, in some examples, includes a mobile computing device or any other portable device. A mobile computing device includes, for example but without limitation, a mobile telephone, laptop, tablet, computing pad, netbook, gaming device, wearable device, Internet of Things (IoT) device, and/or portable media player. The computing device 202 can also include less-portable devices such as servers, desktop personal computers, kiosks, IoT devices, or tabletop devices. Additionally, the computing device 202 can represent a group of processing units or other computing devices. In some examples, the computing device 202 is a device executed in the cloud.

In some examples, the computing device 202 includes a memory 204 that includes the computer-executable instructions 206, a processor 210, and a user interface (UI) 218. The processor 210 includes any quantity of processing units, including but not limited to CPU(s), GPU(s), and NPU(s). The processor 210 is programmed to execute the computer-executable instructions 206. The computer-executable instructions 206 may be performed by the processor 210, performed by multiple processors 210 within the computing device 202, or performed by a processor external to the computing device 202. In some examples, the processor 210 is programmed to execute computer-executable instructions 206 such as those illustrated in the figures described herein. In various examples, the processor 210 is configured to execute one or more of a workload forecaster 220 and an accuracy measurer 242 as described in greater detail below. In other words, the workload forecaster 220 and the accuracy measurer 242, and their respective sub-components described in greater detail below, are implemented on and/or by the processor 210.

The memory 204 includes any quantity of media associated with or accessible by the computing device 202. The memory 204 in these examples is internal to the computing device 202, as illustrated in FIG. 2. In other examples, the memory 204 is external to the computing device 202 or includes memory components both internal and external to the computing device 202. The memory 204 stores data, such as the computer-executable instructions 206 and one or more applications 208. The applications 208, when executed by the processor 210, operate to perform various functions on the computing device 202. The application 208 can communicate with counterpart applications or services, such as web services accessible via the network 244. In an example, the applications 208 represent downloaded client-side applications that correspond to server-side services executing in a cloud, such as the cloud server 246.

The user interface 218 includes a graphics card for displaying data to a user and receiving data from the user. The user interface 218 can also include computer-executable instructions, for example a driver, for operating the graphics card. Further, the user interface 218 can include a display, for example a touch screen display or natural user interface, and/or computer-executable instructions, for example a driver, for operating the display. In some examples, the touch screen display of the user interface 218 enables the user to select a network protocol to utilize for executing cross-device communication, as described in greater detail below. The user interface 218 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands or manipulates data by moving the computing device 202 in one or more ways.

The computing device 202 further includes a communications interface device 216. The communications interface device 216 includes a network interface card and/or computer-executable instructions, such as a driver, for operating the network interface card. Communication between the computing device 202 and other devices, such as but not limited to the cloud server 246, can occur using any protocol or mechanism over any wired or wireless connection. In some examples, the communications interface device 216 is operable with short range communication technologies such as by using near-field communication (NFC) tags.

The computing device 202 further includes a data storage device 212 for storing data, such as, but not limited to data 214. The data storage device 212 in some non-limiting examples includes a redundant array of independent disks (RAID) array.

The data storage device 212, in this example, is included within the computing device 202, attached to the computing device 202, plugged into the computing device 202, or otherwise associated with the computing device 202. In other examples, the data storage device 212 includes a remote data storage accessed by the computing device 202 via the network 244, such as a remote data storage device, a data storage in a remote data center, or a cloud storage.

In some examples, the external device 248 is a device, or devices, external to the computing device 202. For example, as described herein, the external device 248 may be a mobile electronic device, a laptop, a tablet, a wearable device, an augmented reality (AR) or virtual reality (VR) device, or any other suitable device for receiving a query, such as the query 102 from a user, and transmitting the query to the computing device 202.

The computing device 202 further includes the workload forecaster 220. The workload forecaster 220 includes one or more special-purpose processors that are implemented on the processor 210 and perform specialized functions. In some examples, the workload forecaster 220 is an example of the workload categorizer and forecaster 104 illustrated in FIG. 1. The workload forecaster 220 includes a pre-processor 222, a featurizer 224, and a forecaster 228 which, in some examples, are examples of the pre-processor 106, featurizer 108, and forecaster 110, respectively. As described herein, the pre-processor 222 receives queries and/or query traces from, for example, query component 102 and groups queries in a workload based on query templates, the featurizer 224 featurizes the received queries and their respective arrival times by generating various query feature vectors, and the forecaster 228 forecasts query workloads based on the featurized queries.

The forecaster 228 includes one or more ML models that are implemented singularly or together to forecast the query workloads. As illustrated in FIG. 2, the forecaster 228 includes a random forest (RF) model 229, a long short-term memory networks (LSTM) model 230, and a cut and pack algorithm 238. In some examples, the LSTM model 230 is implemented to forecast workload on a next-k basis, and the LSTM model 230, cut and pack algorithm 238, and per-bin model 240 are implemented to forecast workload on a next-$\Delta t$ basis. It should be understood that although illustrated herein as including the RF model 229, LSTM model 230, cut and pack algorithm 238, and per-bin model 240, in some examples, the forecaster 228 includes more or fewer ML models than illustrated in FIG. 2. In other words, some of the RF model 229, LSTM model 230, cut and pack algorithm 238, and per-bin model 240 may be omitted, additional ML models may be included, or both.

In some examples, the RF model 229 is an ensemble learning method that is applied for classification and regression problems. In some examples, the RF model 229 predicts only the next single query and is adapted for predicting next-k queries $q_{n+1}$, $q_{n+2}$, . . . $q_{n+k}$ using past k queries $q_{n-k+1}$, $q_{n-k+2}$, . . . $q_n$. In some examples, the RF model 229 does not support incremental training and fine-tuning.

The LSTM model 230 is, in some examples, a variant of a recurrent neural network (RNN) architecture, designed to learn a sequence of data with both short-term and long-term dependencies. The LSTM model 230 includes an LSTM 232 that captures temporal patterns and is well-suited for solving time-series predictions. The LSTM model 230 includes an encoder-decoder architecture that includes an encoder 234 and a decoder 236 and enables the LSTM model 230 to forecast a window of future queries, with each query consisting of multiple parameters, which solves a multi-variate, multi-step time-series sequence-to-sequence learning problem. Traditional LSTM models are more complex and therefore relatively computationally expensive to train. The LSTM model 230 presented herein exhibits higher accuracy in predicting workloads than the traditional models. The architecture of the LSTM model 230 is illustrated in greater detail below with regards to FIGS. 3A and 3B. In some examples, the LSTM model 230 addresses challenges with the sequence-to-sequence learning approaches in Natural Language Processing (NLP), e.g., machine translation, speech recognition, and the like. In particular, the LSTM model 230 adapts an encoder-decoder architecture and the stacked LSTM model into a modified LSTM model.

Figure 3A:
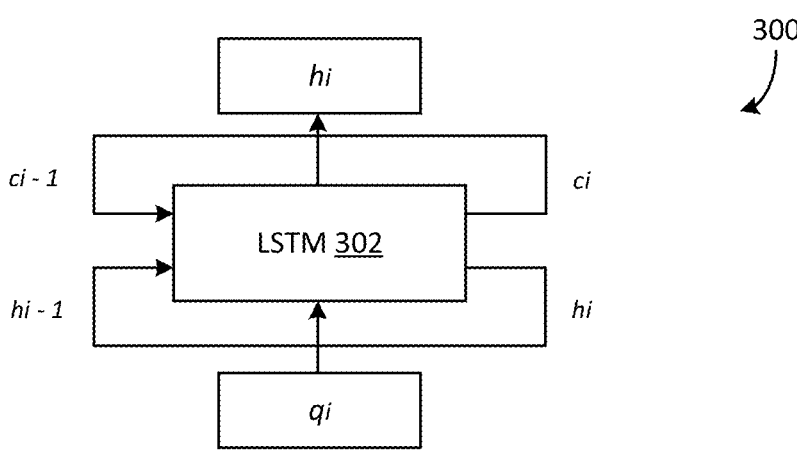
FIG. 3A is a block diagram illustrating an example long short-term memory networks (LSTM) layer.

FIG. 3A is a block diagram 300 illustrating an example LSTM layer according to an example. At each time step i, the LSTM 302 takes an input qi, i.e., an input for the step, and produces a hidden state hi, i.e., a hidden state for the step. Additionally, the LSTM 302 passes two types of states to the next time step: the hidden state hi, which governs short-term memory, and the cell state ci, which governs long-term memory. The LSTM 302 works in a recurrent manner, which can be viewed as multiple copies of the same network at different time steps, with each passing the information (the states) to a successor.

Figure 3B:
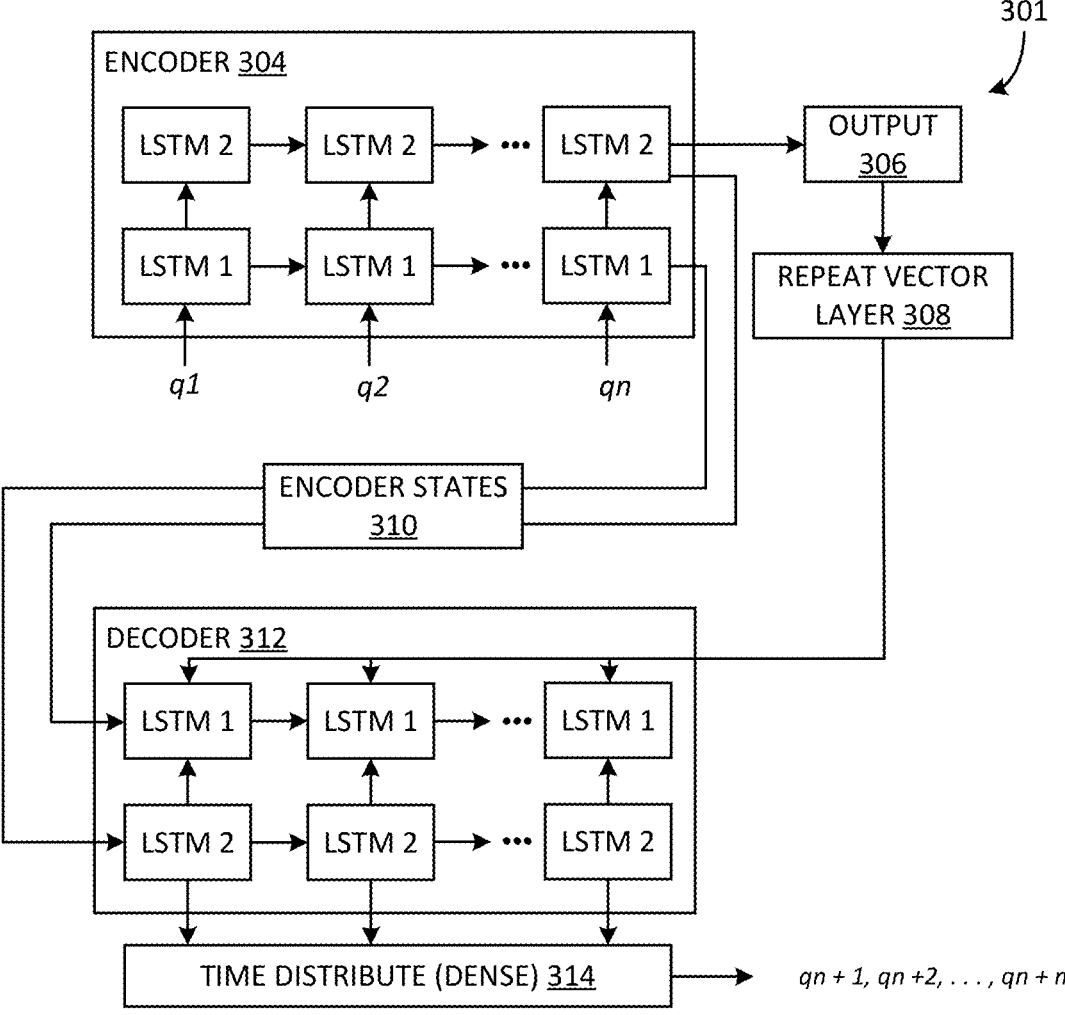
FIG. 3B is a block diagram illustrating an example LSTM encoder-decoder network.

FIG. 3B is a block diagram 301 illustrating an example LSTM encoder-decoder network according to an example. In particular, FIG. 3B illustrates an unrolling of the LSTM model 230 over multiple time steps, allowing the LSTM model 230 shown in FIG. 2 to retain long-term and short-term information and enabling the LSTM model 230 to reason about prior data to inform subsequent ones. The LSTM model 230 includes an LSTM structure integrated with the encoder-decoder architecture as illustrated in FIG. 3B. In some examples, the LSTM structure integrated with the encoder-decoder architecture is referred to a stacked LSTM architecture. The stacked LSTM architecture, as illustrated in FIG. 3B, is deployed with two LSTM layers as the encoder 304. The stacked LSTM shown in FIG. 3B is deeper and provides higher model capacity, i.e., more trainable parameters, to capture more information at different levels and understand more complex representation in data, compared to a more conventional LSTM, as illustrated in FIG. 3A. The first layer of the encoder 304, i.e., LSTM 1, takes query qi, which is preprocessed as the feature vector, at each time steps i, together with previous cell state $c^1$ i−1 and hidden state $h^1$ i−1. The second layer, i.e., LSTM 2, takes the output from LSTM 1 as input, along with its previous cell state $c^2$ i−1 and hidden state $h^2$ i−1. The encoder 304 recursively learns on the entire input sequence until the encoder 304 generates the final output 306. A repeat vector layer 308 is then deployed to replicate the output 306 into m copies, where m is the length of the output sequence. The final encoder states 310, which summarizes the input sequence, are additionally output and include $h^1$n, $c^1$n, $h^2$n, and $c^2$n. The decoder 312 comprises two LSTM layers that are initialized with the final encoder states 310 as inputs. The decoder 312 takes the output 306 together with the previous states $c^1$n and $c^2$n as the input, to generate the hidden state output $h^1$n and $h^2$n for each of the future steps. Finally, the time distributed layer 314 is applied, which is a dense layer, to separate the results into each future time step.

With reference back to FIG. 2, while some query parameters in real workloads are predictable, some parameters are outliers. Accordingly, the LSTM model 230 employs, for example, Huber Loss, which is a robust loss function that is less sensitive to outliers in data compared to naive mean square error or mean absolute error. Given the ground truth feature map f=[fv1, fv2, . . . , fvk], with each feature vector fvi=[fv1i, fv2i, . . . , fvsi] consisting s parameters to forecast, and given a prediction on the feature map f̂=[f̂v1, f̂v2, . . . , f̂vk], the loss function is defined by Equation 1 below.

$$\mathcal{L}oss(f, \hat{f}) = \sum_{i=1}^{t}\sum_{j=1}^{s}\mathcal{L}oss(fv_i^j, \hat{f}v_i^j) \qquad \text{Equation 1}$$

Loss (fv$^j$i, f̂v$^j$i) is defined by Equation 2 below.

$$\mathcal{L}oss(fv_i^j, \hat{f}v_i^j) = \begin{cases} \frac{1}{2}(fv_i^j - \hat{f}v_i^j)^2, & \text{for } |fv_i^j - \hat{f}v_i^j| \le \delta \\ \delta\left(|fv_i^j - \hat{f}v_i^j| - \frac{1}{2}\delta\right), & \text{otherwise} \end{cases} \qquad \text{Equation 2}$$

The LSTM model 230 operates with a feedback loop via feedback received by a feedback receiver 226 to monitor forecasting accuracy, detect workload shifts, automatically fine-tune the ML models to improve performance, and create and delete per-template models as new templates emerge and old templates become inactive. As the LSTM model 230 receives new queries continuously, the LSTM model 230 also receives the ground truth queries for the previous forecast. This enables the monitoring of the individual forecasting accuracy and decisions whether to finetune the models or not. Following the time evolving trend observed in the historical workload used to train the LSTM model 230, the LSTM model 230 reliably generates consistently accurate predictions. However, the real workload can shift, and new evolving patterns can emerge, referred to as a concept shift. The concept shift can lead to an accuracy degradation since the pre-trained models have not been exposed to such patterns before. To identify the workload shifts that trigger the accuracy degradation, an accuracy threshold is set. In some examples, the threshold is decided by the lower bound of the forecasting accuracy expectation by application or DBA. For example, the model is fine-tuned if any individual accuracy is lower than the threshold 75%.

In some examples, the LSTM model 230 is further implemented to forecast queries having a next-Δt. In next-Δt forecasting, to ascertain how many queries to predict, where k is sufficiently large (e.g., exceeding a defined threshold), the next k queries $q_{n+1}$, $q_{n+2}$, . . . $q_{n+k}$ are first predicted from each per-template model. Then, the first predicted query $q_{n+m+1}$ that exceeds the Δt window is found based on the predicted query arrival time, i.e., $t_{qn+m} < t_{qn} + \Delta t \le t_{qn+m+1}$ where m+1≤k. Next, $q_{n+1}$, $q_{n+2}$, . . . $q_{n+m}$ is returned as the output for the forecasted queries for the corresponding template of the model. In some examples, to generate the forecasted queries for the entire workload, the results from each template are sort-merged based on the predicted arrival time.

In some examples, the cut and pack algorithm 238 cuts large templates and packs small templates into the bins so that each per-bin model 240 has adequate capacity for the next-Δt forecasting approach, given a value k. Execution of the cut and pack algorithm 238 begins by measuring the size of a template for a given time window Δt. In some examples, in order to more accurately forecast queries for the given time window Δt and/or more precisely forecast queries for sub-windows within the given time window Δt, a finer granularity time window Δt' of Δt is selected. For example, if Δt=1 day, Δt'=1 hour is selected. The cut and pack algorithm 238 calculates a query arrival rate per Δt' window for each template and builds a one layer LSTM model 230 to predict the arrival rate for the next l windows, where l is sufficiently large for a time interval of periodic re-adjustment of models. That is, "l" is an empirically set value. Thus, if Δt=1, then "l" can be set to one week. is In some examples, to define the size of the template for the Δt window, denoted as σ (tempi, Δt) or simply σi if there is no ambiguity, the upper bound of the query rate is used for the Δt window based on the predictions. In some examples, when observations indicate that Δt is relatively large, such as one day, most of the templates in the observed workloads have stable query rates. Thus, the upper bound of the historical rate may be used as the template size.

In some examples, the cut and pack algorithm 238 includes a cut phase and a bin phase. In the cut phase, a large template, i.e., a template having a size that is greater than k, is divided into smaller sub-templates such that each sub-template has a size that is less than k. In some examples, the division is based on the query arrival time. For instance, if $\Delta t=1$ day, the template is split into two sub-templates based on query arrival times: one with queries between [0:00, 12:00) and another with queries between [12:00, 24:00). In some examples, the number of cuts and the actual cutting points are determined based on the size of the sub-templates, which can be estimated using the arrival rate prediction discussed earlier. Dividing the template results in multiple sub-templates, each of which has a size that is smaller than k. Each of the sub-templates is then treated as a new template. In the bin phase, following the cut phase, the sizes of all templates in the bin are smaller than k.

In some examples, some templates may remain present that are smaller than k. In other words, these templates receive a relatively small number of queries and are likely to be forecasted. For these templates, it would be an inefficient use of resources to assign each template to a separate bin. Thus, the cut and pack algorithm 238 applies a greedy bin-packing algorithm to pack these templates into collective bins, each of which has a size less than k, in order to avoid generating a per-bin model 240 for each individual template that has a value for less than k.

In addition to detecting pattern changes in existing query templates, the LSTM model 230 also has the capability to continuously identify emerging templates and inactive templates, i.e., templates that do not have queries showing up for a defined period of time. For new templates, the LSTM model 230 collects the training data and trains new models for them. A new template is then either fit into an existing bin, in examples where the bin capacity allows, and the existing per-bin model 240 is fine-tuned. As referenced herein, a bin, or bucket, is a selection of templates having the same or similar parameter values. In some examples, a single per-bin model 240 is used to predict, or forecast, future queries for all the templates in the bin. In examples where the bin capacity does not allow for the new template, a new bin is initialized and trained on the collected training data. For inactive templates, because the inactive template has no queries presenting, during periodic fine-tuning on the new observed data, the model does not forecast the queries for the template. In some examples, the inactive template may be deleted or moved to a backup storage location. The LSTM model 230 tracks, or monitors, a size of each template and maintains a per-bin model 240 to be used for predicting queries for query templates of the template size. In examples where a total size of templates for a bin steadily exceeds the bin capacity, the bin is divided into sub-bins and the assignment of templates into the sub-bins is adjusted so that each sub-bin size is no greater than k. New models for the sub-bins are then trained from scratch. In some examples, historical queries that belong to a sub-bin is used to train the models. That is, the sub-bin are treated as if it were a regular/normal bin, and the models are trained the same way as the per-bin model.

In some examples, the per-bin model 240 includes one or more LSTM models trained specifically to be used in the next-$\Delta t$ forecasting approach described herein. Thus, the per-bin model 240 is an adapted version of the LSTM model 230. The per-bin model 240 includes the template ID incorporated as a feature and the feature map encompasses parameter values from all templates within the bin, in order to account for multiple templates within each bin during featurization. The per-bin model 240 is further extended to predict the template ID as well as all the parameter values for the bin, so that the predicted query may be reconstructed with the right template and parameter values.

With continued reference to FIG. 2, the computing device 202 further includes an accuracy measurer 242 that measures the accuracy of the forecast generated by the workload forecaster 228. Measuring the accuracy of the forecasted result is dependent on the use case or application for which the forecast will be used, and the definition of whether the forecasted result is accurate may be customizable in the workload forecaster 228. In various examples, the accuracy measurer 242 measures the accuracy using one of several different methods, including naive and strict accuracy, set-oriented accuracy, containment-based accuracy, and time-sensitive accuracy. When using naive and strict accuracy, given the forecasted queries $\hat{q}_{n+1}$, $\hat{qi}_{n+2}$, . . . , $\hat{q}_{n+k}$ and the ground truth $q_{n+1}$, $q_{n+2}$, . . . , $q_{n+k}$, the accuracy is defined as $$Acc = \frac{|q^\wedge n + i = qn + i|}{k},$$

$$\forall\, i \in [1, k].$$

$\hat{q}_{n+i}=q_{n+i}$ is defined as the forecasted feature vector for $q_{n+i}$, which is element-wise equal to the ground truth feature vector $f\hat{v}^j_{n+i}=fv^j_{n+i}$, $\forall j \in |f\hat{v}_{n+i}|$. Accordingly, this definition of accuracy requires not only the predicted queries to match exactly with the ground truth queries, but also the orders of the queries have to match exactly. Practically, the naive and set accuracy method presents challenges as applications may be more concerned with the expected queries during a specific time interval in the future regardless of the order or actual arrival time. By disregarding the order, the workload is treated in a given time window as a set of queries and establishes a new accuracy measurement based on sets.

When using set-oriented accuracy, given the forecasted query set $\hat{Q}$ and the ground-truth query set Q for the future time window $\Delta t$, set-oriented accuracy is defined as $$Acc = \frac{|matcheq\,(Q,\, {}^\wedge Q)|}{|Q|},$$

where $match_{eq}(Q,\, \hat{Q})=\{q|q\in Q\wedge \exists \hat{q}\in \hat{Q}\wedge q=\hat{q}\}$.

In some examples, containment-based accuracy is utilized for a large number of applications, such as caching, index tuning, view recommendation, partitioning of tables, and determination of the MDC of tables, where a well forecasted future workload for a specific period of time covers most of the ground-truth queries, for example, greater than 50%, and in some examples, greater than 70%. The specific order of queries may be insignificant and the predicted queries do not need to exactly match ground-truth queries. In some examples, the containment semantic is adequate to be considered as a match. A query q1 is contained in another query q2, denoted as q1⊆q2, if for every database instance d, $q_1(d)\subseteq q_2(d)$, where $q_i(d)$ is set (or multi-set) of the tuples resulted in evaluating $q_i$ on d. Given the forecasted query set $\hat{Q}$ and the ground-truth query set Q for the future time window $\Delta t$, this containment-based accuracy is defined as $$Acc = \frac{(matchcon\,(Q,\, {}^\wedge Q)|)}{|Q|},$$

where $match_{con}(Q,\, \hat{Q})=\{q|q\in Q\wedge \exists \hat{q}\in \hat{Q}\wedge q\subseteq \hat{q}\}$.

In some examples, time-sensitive accuracy is utilized for applications where a pinpoint query arrival time is not necessary at a granular level, for example, seconds or milliseconds. When using time-sensitive accuracy, the prediction time window is broken into smaller windows, e.g., hourly windows for a $\Delta t=1$ day, and the accuracy for each of the smaller windows is computed using either the set-oriented or the containment-based accuracy definition and then the average accuracy across the smaller windows is used as the final accuracy.

Figure 4:
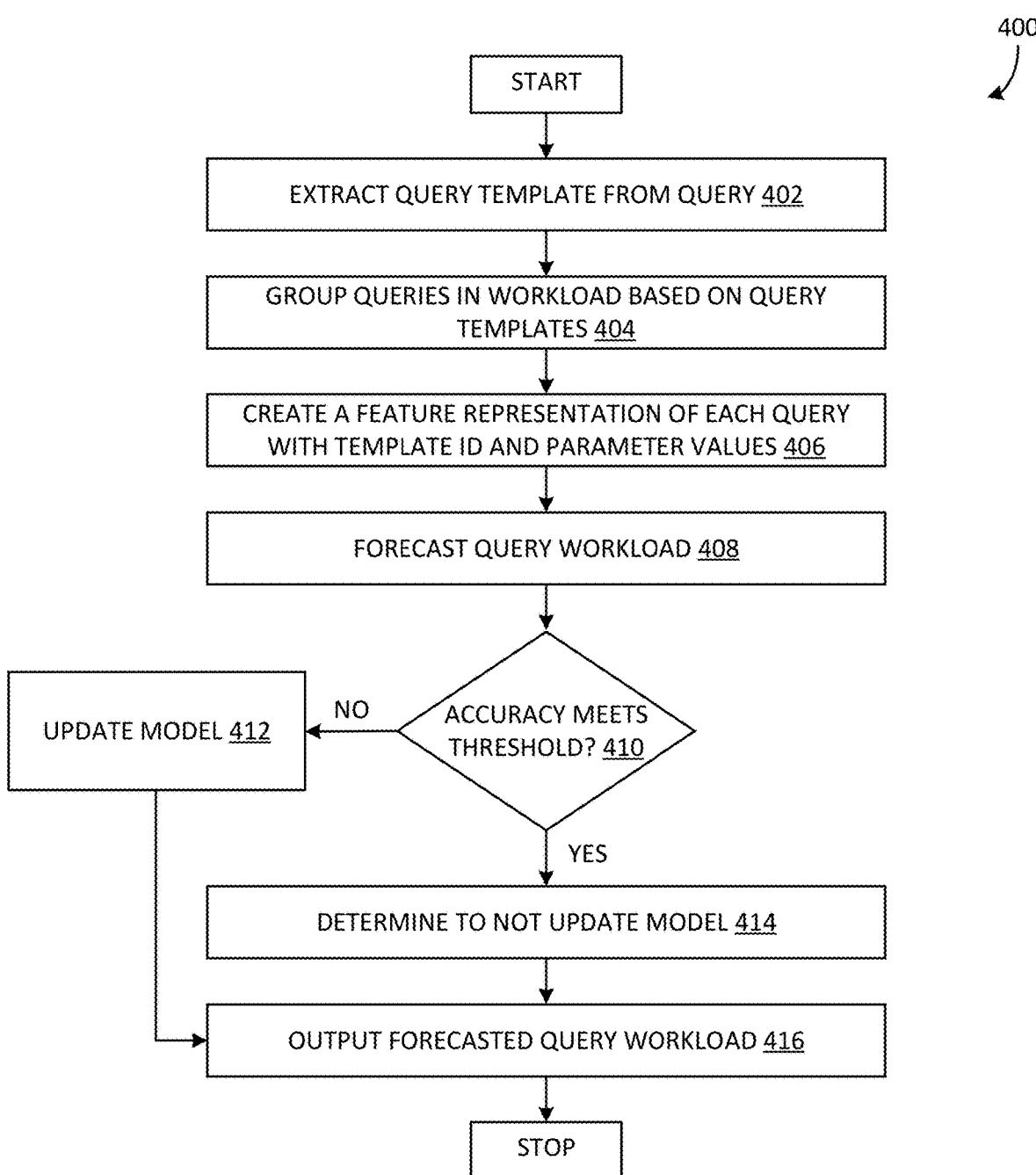
FIG. 4 is an example flowchart illustrating a computer-implemented method of characterizing and forecasting evolving query workloads.

FIG. 4 is an example flowchart illustrating a computer-implemented method of characterizing and forecasting evolving query workloads. The computer-implemented method 400 of FIG. 4 is provided for illustration only and should not be construed as limiting. Other examples of the computer-implemented method 400 can be used without departing from the scope of the present disclosure. In some examples, the computer-implemented method 400 is implemented by one or more components of the computing device 202.

The method 400 begins by the pre-processor 222 extracting a query template from a received query in operation 402. As described herein, the pre-processor 222 extracts the query template by parsing the query to create an AST and transforms the literals in the AST into parameter markers. In operation 404, the pre-processor 222 groups the queries in the workload based on the extracted query templates.

In operation 406, the featurizer 224 creates a feature representation of each query with a template ID and parameter values. The featurizer 224 generates a vector, such as a query feature vector or an arrival-time feature vector, for each received query and its predecessor. In operation 408, the forecaster 228 forecasts a query workload based on the generated vector. In some examples, the featurizer 224 determines a threshold quantity of recurring queries using the templates that have been extracted to proceed with the computer-implemented method 400. To forecast the query workload, the forecaster 228 implements at least one ML model selected from the RF model 229, the LSTM model 230, the cut and pack algorithm 238, and the per-bin model 240.

In operation 410, the accuracy measurer 242 determines whether feedback, received via the feedback receiver 226, indicates that the accuracy of the forecasted workloads meets an accuracy threshold. In some examples, the accuracy threshold is 75% accurate; however, the accuracy threshold may be lower or higher than 75% without departing from the scope of the disclosure. In examples where any individual accuracy does not meet the accuracy threshold, the forecaster 228 updates, or fine-tunes, one or more of the ML models in operation 412. In examples where each individual accuracy meets the accuracy threshold, the forecaster 228 determines not to update, or fine-tune, one or more of the ML models in operation 414.

In operation 416, the forecasted query workload is output. In some examples, the forecasted query workload is output, or presented, using the UI 218. In other examples, the forecasted query workload is used by the workload forecaster 220 to allocate computational resources over the given time interval in order to more efficiently respond to or resolve the forecasted queries. The method 400 then terminates.

Figure 5:
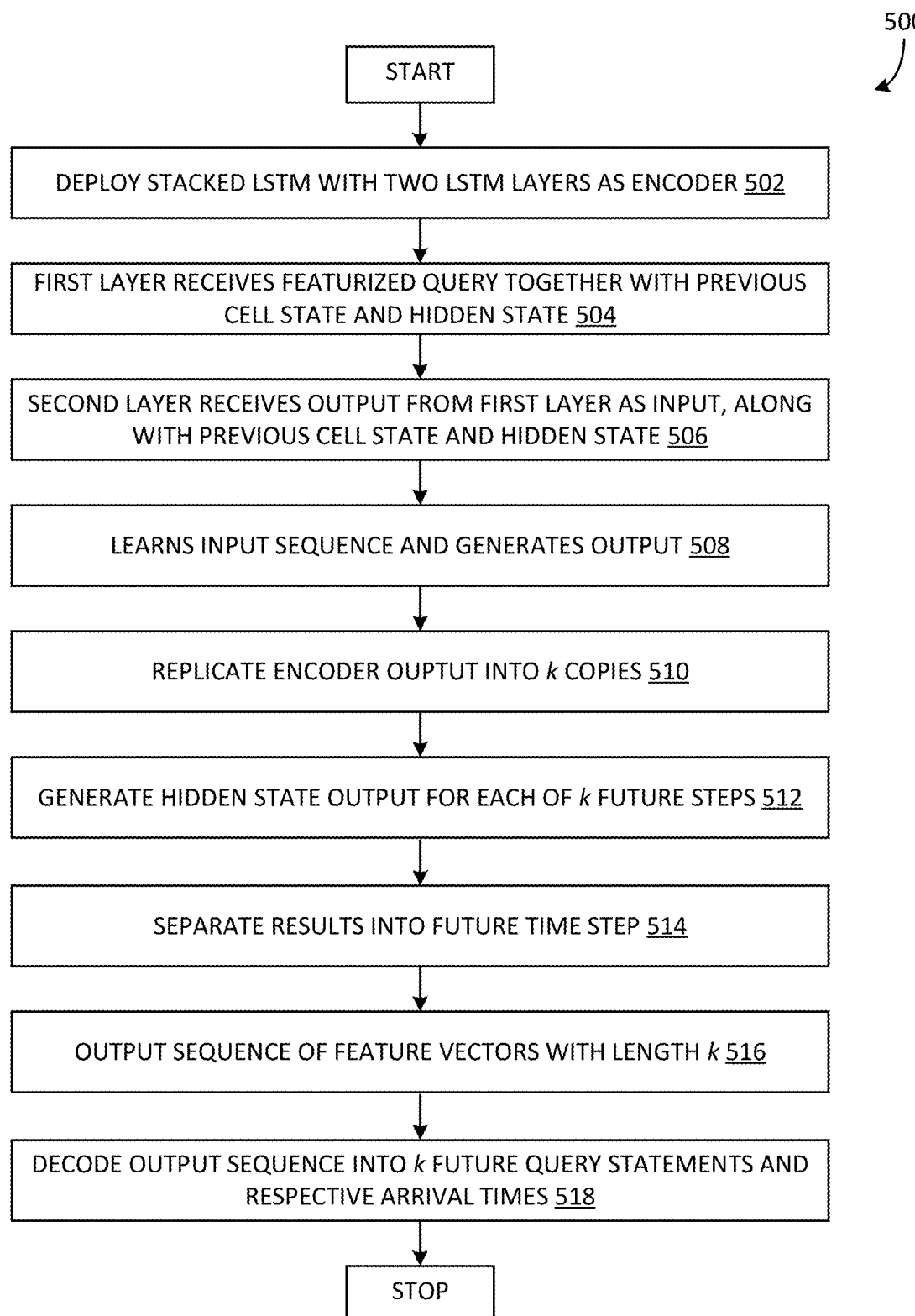
FIG. 5 is an example flowchart illustrating a computer-implemented method of forecasting evolving next-k query workloads using LSTM integrated with an encoder-decoder architecture.

FIG. 5 is an example flowchart illustrating a computer-implemented method of forecasting evolving next-k query workloads using the LSTM model 230 integrated with an encoder-decoder architecture, as illustrated in FIG. 3B. The computer-implemented method 500 of FIG. 5 is provided for illustration only and should not be construed as limiting. Other examples of the computer-implemented method 500 can be used without departing from the scope of the present disclosure. In some examples, the computer-implemented method 500 is implemented by one or more components of the computing device 202.

The method 500 begins by the LSTM model 230 deploying as a stacked LSTM utilizing two LSTM layers as an encoder in operation 502. In some examples, the stacked LSTM is deeper and provides higher model capacity, i.e., more trainable parameters, to capture more information at different levels and model representation in data that is more complex when compared to a non-modified LSTM model. The stacked LSTM may use more than two LSTM layers in some examples without departing from the scope of the present disclosure.

In operation 504, a first layer of the LSTM model 230, such as the LSTM 302 layer illustrated in FIG. 3A, receives a featurized query qi, which is preprocessed as the feature vector, at a time step i, together with previous cell state $c^1 i-1$ and hidden state $h^1 i-1$. In operation 506, a second layer of the LSTM model 230, such as a second iteration of the LSTM 302 layer, receives the output from the first layer of the LSTM model 230 as an input along with the previous cell state $c^2 i-1$ and hidden state $h^2 i-1$. In operation 508, the encoder 234 recursively learns on the entire input sequence, i.e., the output from the first layer of the LSTM model 230 as an input along with the previous cell state $c^2 i-1$ and hidden state $h^2 i-1$, and generates an output, which is referred to as a final encoder state. The final encoder state summarizes the input sequence and includes $h^1 n$, $c^1 n$, $h^2 n$, and $c^2 n$. In operation 510, the LSTM model 230 replicates, via a repeat vector layer, the encoder output into k copies, where k is the number of queries to be forecast.

In operation 512, the decoder 236, which comprises two LSTM layers initiates with the final encoder state, takes the encoder output together with the previous states as an input and generates the hidden state output for each future iteration. In operation 514, a time distributed layer is applied to separate the generated hidden state output into a feature vector for each future time step. In operation 516, the LSTM model 230 outputs the sequence of feature vectors for each future time step with a length of k. In operation 518, the output sequence is decoded into k future query statements and respective arrival times for each forecast query.

The implementation of the next-k forecasting models, as illustrated in FIG. 5, provides improved accuracy and average containment-diff ratios as illustrated below in Tables 5 and 6, respectively. For example, Table 5 illustrates the average accuracy for the per-template models in each workload with different window sizes k. It should be noted that the workload 4 has a relatively smaller number of queries, leading to smaller k values for this workload. This is necessary to ensure sufficient training samples when sliding the input window over the query traces. In the next-k forecast approach, since $|Q|=|\hat{Q}|=k$, the recall, precision, and F1 score values are identical, resulting in a single reported accuracy value. In particular, the results illustrate the LSTM model 230 clearly outperforms existing models. The history-based approach has very low accuracy, especially for Workloads 1, 2, and 3. The vanilla LSTM, i.e., a non-modified LSTM model, generally works better than Random Forest. To ensure that the predicted queries do not overshoot for range predicates and IN clause predicates in the containment-based matches. The results show that the LSTM model 230 does not introduce significant over-prediction.

TABLE 5

| Accuracy results (%) for next-k forecasting approach on workloads | | | | | | | | | | | |
| --- | --- | --- | --- | --- | --- | --- | --- | --- | --- | --- | --- |
| | WL1 | | | WL2 | | | WL3 | | | WL4 | | |
| k | 100 | 500 | 1000 | 100 | 500 | 1000 | 100 | 500 | 1000 | 100 | 200 | 500 |
| History-based | 27.4 | 17.0 | 31.8 | 7.0 | 13.4 | 32.8 | 12.8 | 11.2 | 7.9 | 47.8 | 64.9 | 72.8 |
| RF | 85.4 | 82.3 | 80.5 | 83.7 | 83.2 | 82.6 | 91.4 | 90.2 | 88.6 | 79.6 | 75.3 | 71.2 |
| LSTM | 91.0 | 90.3 | 90.1 | 89.3 | 88.7 | 88.2 | 92.0 | 92.3 | 91.8 | 84.9 | 85.3 | 80.7 |
| Modified LSTM | 95.8 | 96.7 | 95.4 | 94.6 | 95.4 | 94.7 | 96.0 | 96.2 | 95.8 | 92.4 | 91.7 | 88.2 |

TABLE 6

| Average Containment-diff ratio (%) for the next-k forecasting approach | | | | | | | | | | | |
| --- | --- | --- | --- | --- | --- | --- | --- | --- | --- | --- | --- |
| | WL1 | | | WL2 | | | WL3 | | | WL4 | | |
| k | 100 | 500 | 1000 | 100 | 500 | 1000 | 100 | 500 | 1000 | 100 | 200 | 500 |
| History-based | 3.50 | 4.24 | 1.01 | 1.14 | 1.19 | 0.73 | 1.88 | 2.86 | 3.04 | 0.50 | 0.49 | 0.55 |
| RF | 0.15 | 0.04 | 0.16 | 0.08 | 0.08 | 0.12 | 0.22 | 0.11 | 0.22 | 0.25 | 0.09 | 0.28 |
| LSTM | 0.32 | 0.11 | 0.21 | 0.11 | 0.18 | 0.07 | 0.31 | 0.31 | 0.35 | 0.11 | 0.19 | 0.04 |
| Modified LSTM | 0.19 | 0.22 | 0.16 | 0.16 | 0.13 | 0.10 | 0.25 | 0.16 | 0.19 | 0.36 | 0.26 | 0.14 |

In some examples, the selection of k depends on computational and memory resources available. The maximum forecasting window size is set as 1,000 to avoid the out-of-memory error given the machine memory constraint. As shown in Table 5, the selection of k also affects model accuracy. A smaller k can result in a more accurate forecast but may also increase the risk of model instability or over-fitting. A larger k predicts for a large forecasting window at once, but it poses challenges on accuracy and model scalability. The experimental results show that the LSTM model 230 provides improved model scalability. For example, when scaling up the prediction window size, the variance of the accuracy is smaller compared to other baselines.

Figure 6:
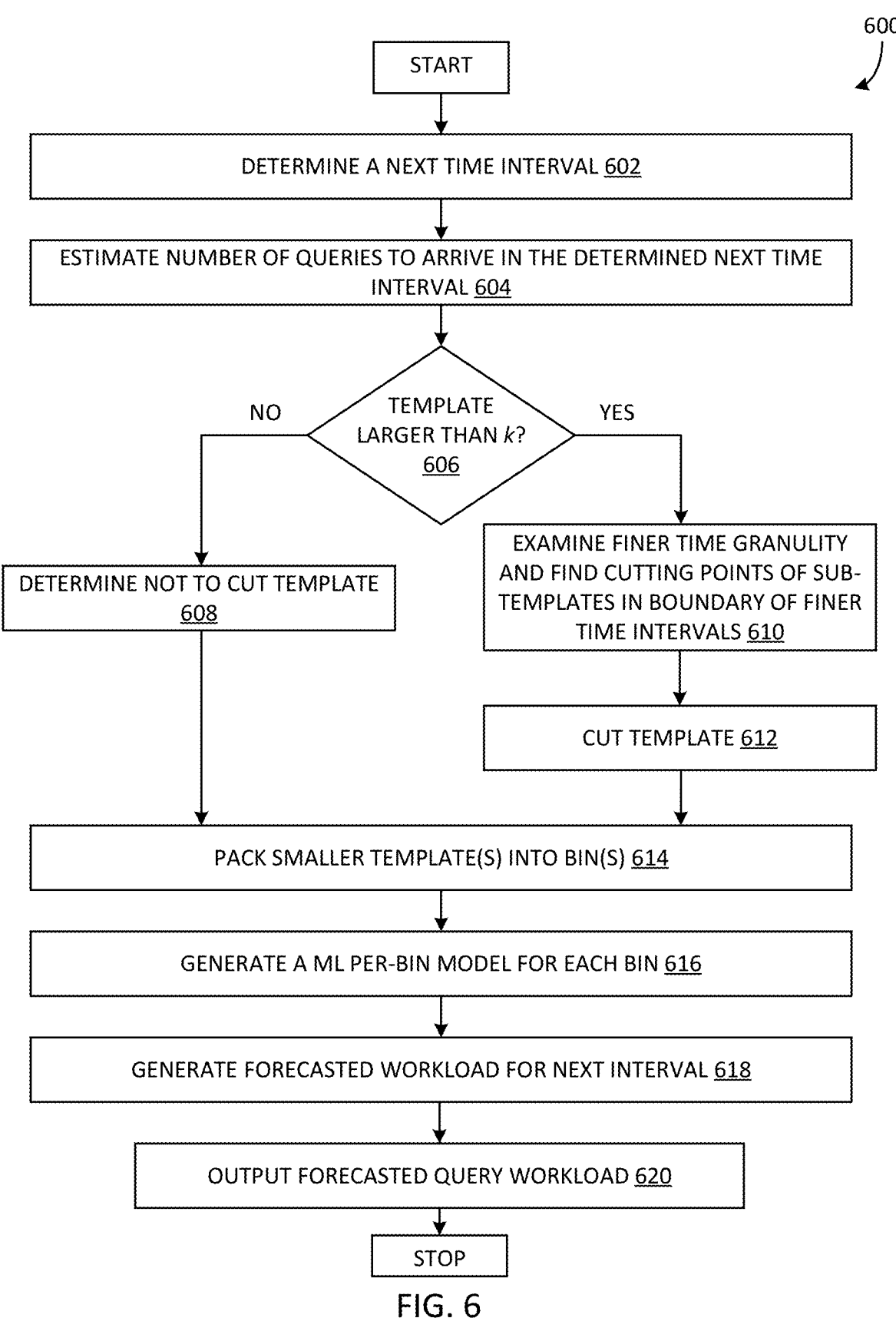
FIG. 6 is an example flowchart illustrating a computer-implemented method of forecasting evolving next-$\Delta t$ query workloads.

FIG. 6 is an example flowchart illustrating a computer-implemented method of forecasting evolving next-$\Delta t$ query workloads. The computer-implemented method 600 of FIG. 6 is provided for illustration only and should not be construed as limiting. Other examples of the computer-implemented method 600 can be used without departing from the scope of the present disclosure. In some examples, the computer-implemented method 600 is implemented by one or more components of the computing device 202.

The method 600 begins by the cut and pack algorithm 238 determining a next time interval for which to forecast queries in operation 602. The determined time interval may be referred to herein as a next-$\Delta t$. In various examples, the determined time interval is one hour, two hours, four hours, twelve hours, twenty-four hours, and the like. In operation 604, the cut and pack algorithm 238 estimates a number of queries that will arrive during the determined next time interval. In some examples, estimating the number of queries includes estimating the template size. To estimate the template size, the cut and pack algorithm 238 trains a layer of the LSTM 232 and utilizes a finer $\Delta t''$ granularity to collect $\sigma i$ ($\Delta t''1$), $\sigma i$ ($\Delta t''2$), . . . , $\sigma i$ ($\Delta t''m$) for each $\Delta t$ interval in the historical workload, and trains the LSTM 232 to forecast the future arrival rates $\hat{\sigma} i$ ($\Delta t''1$), $\hat{\sigma} i$ ($\Delta t''2$), . . . , $\hat{\sigma} i$ ($\Delta t''m$). The finer $\Delta t''$ granularity refers to a smaller $\Delta t$ within the determined next time interval. For example, where the determined next time interval is one day, i.e., twenty-four hours, the finer $\Delta t''$ granularity may be $\Delta t''$=one hour with twenty-four smaller intervals.

The cut and pack algorithm 238 sums these predictions, i.e., the forecasted future arrival rates, and computes $\hat{\sigma} i$ ($\Delta t$). In some examples, to ensure the next-$\Delta t$ forecasting models can stably predict multiple successive $\Delta t$ windows without retraining, the cut and pack algorithm 238 sets a longer forecasting horizon $\Delta T$, e.g., $\Delta T$=1 week given $\Delta t$=1 day. This provides a longer preview of future arrival rates, $\hat{\sigma}(\Delta t\,1)$, $\hat{\sigma} i$ ($\Delta t2$), . . . , $\hat{\sigma} i$ ($\Delta tl$). The cut and pack algorithm 238 further conservatively use the upper bound of all forecasted $\hat{\sigma} i$ ($\Delta tj$) to approximate the template size in next-$\Delta t$, i.e., $e\sigma i$ ($\Delta t$)=$\max(\hat{\sigma} i(\Delta tj))$, $\forall \Delta tj \in \Delta T$. Similarly, the template size for smaller interval $\Delta t''x$ of $\Delta t$ is approximated as $e\sigma i$ ($\Delta t''x$)=$\max(\hat{\sigma} i(\Delta t''jx))$, $\forall \Delta tj \in \Delta T$.

As described herein, the query arrival rates for different templates may vary. For example, as illustrated in FIGS. 7A and 7B, the smallest template only has ~10 queries per day, as illustrated in the histogram 700, while the largest template in a particular workload may have ~ten thousand queries per day, as illustrated in the histogram 710. It should be understood that the example templates illustrated in FIGS. 7A and 7B are presented for illustration only and should not be construed as limiting. The smallest template may have more or fewer than ten queries per day, and the largest template may have more or fewer than ten thousand queries per day. Where the prediction window is one day, i.e., $\Delta t$=1 day, such as for a materialized view recommendation, the workload forecaster 220 for the largest template has to predict ~ten thousand queries. However, even when trained on massive clusters of GPUs, sequence-to-sequence learning neural networks typically maintain a 512 to 2048 forecasting window size. Thus, it is not always practical to increase k to fit the $\Delta t$ window size. On the other hand, a long tail of small templates can often be observed in real workloads; however, it is inefficient to train a large number of per-template models for all the small templates. To address these challenges, the cut and pack algorithm 238 is implemented to reorganize workload queries into bins and train the per-bin model 240 to address the next-$\Delta t$ forecasting challenge, as described herein. The cut and pack algorithm 238 ensures that given the target Δt and a computationally feasible k value based on the available resources for model training, k is large enough such that the next-k queries predicted from each per-bin model cover all the queries needed for the next-Δt time window.

Returning to the method 600, in operation 606 the cut and pack algorithm 238 determines whether the forecasted template is larger than the k value. In other words, the cut and pack algorithm 238 compares the forecasted number of queries to arrive to the forecasted template and, where the template is larger than the forecasted number of queries k, cuts the template into sub-templates that are smaller than or equal to k. In some examples, the cut and pack algorithm 238 uses eσi (Δt) to identify templates larger than k. In examples where the template is not larger than k, in operation 608 the cut and pack algorithm 238 determines not to cut the template, as the template size is sufficient to handle the forecasted number of queries.

In operation 610, based on determining the template is larger than k, the cut and pack algorithm 238 examines a finer time granularity and identifies a cut point for sub-templates in the boundary of the finer time intervals. As referenced herein, a cut point is a boundary at which the cut and pack algorithm 238 cuts a template into two or more sub-templates. For example, the cut and pack algorithm 238 selects a sufficiently fine-grained time window Δt" to divide Δt into finer intervals Δt"1, Δt"2, . . . , Δt"m. In some examples, the finer intervals are of even, or equal, size. For example, as described herein, wherein the next time interval is one day, i.e., Δt=1 day, the finer time granularity may be determined as Δt"=1 hour with twenty-four small time intervals. In other examples, the finer intervals are not of even size. The finer time granularity Δt" is examined and the cut and pack algorithm 238 finds the cutting points of sub-templates in the boundary of finer time intervals.

In operation 612, the cut and pack algorithm 238 cuts the template at a determined cut point. An example of template cutting is illustrated in FIG. 8A, while an example template cutting algorithm is illustrated in FIG. 8B. In some examples, the sub-intervals are not of equal length in time. For example, FIG. 8A illustrates a template 802, a first sub-template 804, and a second sub-template 806. The template 802 includes two sub-intervals Δt'1 and Δt'2 of Δt. After splitting, the first sub-template 804 and the second sub-template 806 are created. The first sub-template 804 only contains queries that fall into the Δt'1 time-frame of every Δt interval, whereas the second sub-template 806 contains queries in the Δt'2 time-frame of every Δt interval. Assuming an accurate model for each sub-template, the cut and pack algorithm 238 learns the new patterns, i.e., only having queries in its corresponding sub-interval, in the sub-template, and predicts future queries based on the new patterns, i.e., only predicting queries in its corresponding sub-interval. Combining the forecasted queries from both models will result in the forecasted queries for the entire Δt interval.

As illustrated in the example template cutting algorithm 810 illustrated in FIG. 8B, the algorithm begins with Δt"1 and searches for a cutting point that results in the largest sub-template with a size no greater than k by utilizing the estimated eσi (Δt"j). After the cut is made, it moves on iteratively to search for the cutting point for the next sub-template.

In operation 614, following each template being cut into a size no larger than k or after determining templates are not to be cut (e.g., in operation 608), the cut and pack algorithm 238 packs smaller templates into bins. For example, while some templates are of larger size than k, other templates may be much smaller than k. It should be understood that when packing smaller templates into bins, the cut and pack algorithm 238 considers the number of templates per bin so as to avoid packing too many small templates into a bin. This reduces the risk of reduced accuracy of forecasting due to implementing more per-bin models than needed. Thus, the cut and pack algorithm 238 sets a maximum number of templates per bin to a constant value, such as d. The value of d controls the degree of 'packing' and brings a tradeoff, where a smaller d may lead to a higher model accuracy but can result in more bins and thus more per-bin models to train and a higher overhead. In some examples, d=50 to optimize the balance between model accuracy and model management overhead. Template packing is formulated as an integer linear programming problem, as illustrated in Equation 3 below.

$$\text{minimize } \#bins = \sum_j y_j \qquad \text{Equation 3}$$

$$\text{subject to } \#bins \geq 1$$

$$\sum_{i \in bin_j} (\sigma_i(\Delta t)) \leq k, \, \forall \, temp_i \in bin_j, \, \forall \, bin_j$$

$$\#templates\_in\_bin_j \leq d, \, \forall \, bin_j$$

$$\sum_j x_{ij} = 1, \, \forall \, temp_i$$

$$y_j, x_{ij} \in \{0, 1\}, \, \forall \, temp_i, bin_j$$

For example, where yj=1 if bin j is used and xij=1 if template i is put into bin j. This prefers a bin with fewer templates when multiple bins can fit a template.

In operation 616, the cut and pack algorithm 238 generates a ML model that is particular to each created bin, which learns the distinct patterns for the templates present in the respective bin and predicts future queries for these templates. In some examples, after packing, one or more bins may not be fully occupied, i.e., may have sizes smaller than k. Thus, an effective model for a particular bin will accurately predict queries for these templates in the next-Δt interval. In some examples, the per-bin model 240 for each bin may utilize aspects of the LSTM model 230, as described herein, as trained for the specific bin. However, the generated per-bin model 240 includes a more complex feature map, because it includes queries from all templates within the bin. To account for the possibility of multiple templates within each bin during featurization, the template ID is included as a feature. Further, the feature map encompasses the parameter values from all templates within the bin. The process of executing the generated per-bin model 240 is also more complex than the LSTM model 230 in examples where a mixed time-series pattern of various templates within the bin are forecasted. For example, the per-bin model 240 accurately forecasts the template ID and all parameter values within the bin, to ensure that the predicted query can be correctly reconstructed with the appropriate template and parameter values.

In operation 618, the per-bin model 240 generates a forecasted workload for the determined next time interval as described herein. In some examples, the forecasted workload includes an x amount of forecasted queries for the determined time interval. In operation 620, the forecasted query workload is output. In some examples, the forecasted query workload is output, or presented, using the UI 218. In other examples, the forecasted query workload is used by the workload forecaster 220 to allocate computational resources over the given time interval in order to more efficiently respond to or resolve the forecasted queries. Following the forecasted workload being output, the method 600 terminates.

Figure 9:
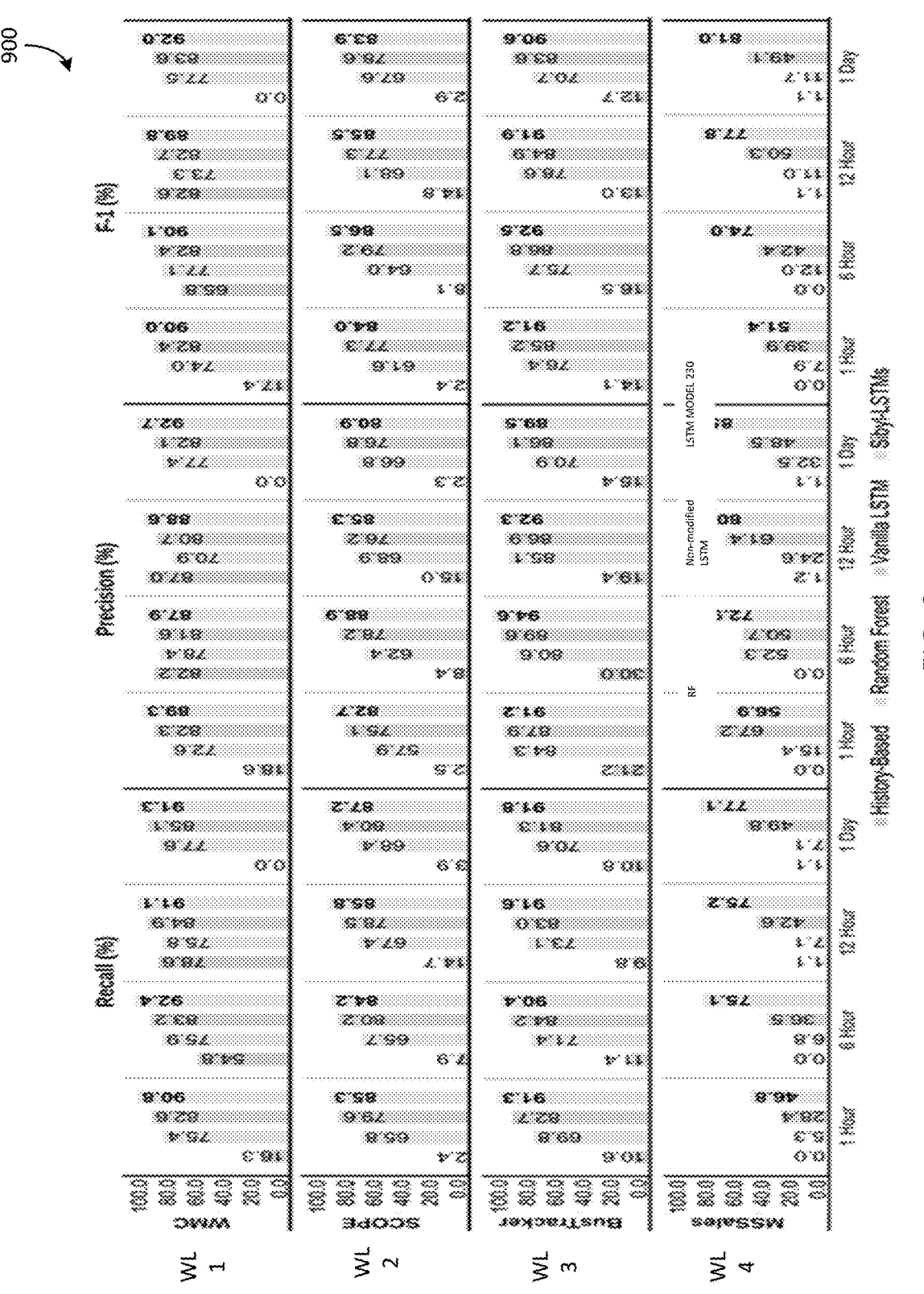
FIG. 9 illustrates example accuracy results for the forecasted evolving next-$\Delta t$ query workloads.

FIG. 9 illustrates example accuracy results for the forecasted evolving next-Δt query workloads. The example accuracy results illustrated in FIG. 9 are presented for illustration only. Various examples of accuracy results may be generated and presented without departing from the scope of the present disclosure.

In some examples, the evaluation results are generated by the accuracy measurer 242. It should be understood that measuring the accuracy of the forecasting results is dependent on the specific use case or the application for which the workload is forecasted. The accuracy measurer 242 utilizes a general metric that can be customized for specific scenarios. Given the predicted workload ˆQ and the ground-truth future workload Q, recall, precision, and F1 score are used as our evaluation metric with a customizable function match (Q, ˆQ) that defines the bag (allowing duplicates) of ground truth queries in Q that are matched by the queries in ˆQ, and can be tailored to a specific application. Recall is presented in Equation 4, precision is presented in Equation 5, and F1 is presented in Equation 6.

$$Recall = \frac{|match(Q, \hat{Q})|}{|Q|} \qquad \text{Equation 4}$$

$$Precision = \frac{|match(Q, \hat{Q})|}{|\hat{Q}|} \qquad \text{Equation 5}$$

$$F1 = \frac{2 \cdot precision \cdot recall}{precision + recall} \qquad \text{Equation 6}$$

In some examples, the accuracy measurer 242 implements strict matching, where both parameter values as well as arrival time of forecasted queries exactly match with the ground truth queries. In other examples, such as caching, index tuning, view recommendation, partitioning of tables, determination of the MDC of tables, and the like, a forecasted workload for a specific period of time covers most, e.g., 50%, of the ground-truth queries. The precise ordering of queries or actual arrival time may be insignificant, as the accuracy measurer 242 focuses on determining which queries are to be included in a given time window for which tuning is performed. Thus, the forecasted workload, in the given time window, is treated as a collection of queries.

Similarly, a containment metric may be used for matching a ground-truth query with a predicted query. In some examples, a query q1 is referred to as contained in another query q2, i.e., q1⊆q2, if for every database instance d, q1(d)⊆q2(d), where qi(d) is the collection of tuples resulted in evaluating qi on d. In some examples, containment is measured only using predicate values. For equality predicate, the forecaster 228 gives a single value and exact matching is performed. For range predicates, a match is considered if the predicted range contains the ground-truth range. In the example of an IN clause, a match is considered if the predicted value is a superset of the ground truth value. Given the forecasted query collection ˆQ and the ground truth query collection Q, the containment-based match is defined as matchbag, ⊆(Q, ˆQ)={q∈Q|∃ˆq∈ˆQ, q⊆ˆq}.

In some examples, to better understand the effectiveness of forecasting in terms of containment, the accuracy measurer 242 further measures the degree of the containment relationship for each matched ground-truth and predicted query pair. In some examples, the accuracy measurer utilizes a metric referred to as an average containment-diff ratio to measure the degree of the containment relationship for each matched ground-truth and predicted query pair. For a predicted range Rˆ and a ground truth range R, the containment-diff ratio is defined as (|ˆR|−|R|)/|R|. In examples of a half-bounded range predicate, such as col>a, all the observed parameter values related to col are used to obtain the upper bound $max_{col}$ and lower bound$min_{col}$, and the range (a, ∞) is changed to (a, $max_{col}$) before computing the containment-diff ratio. Similarly, for IN-clause predicates, given a predicted set Sˆ and ground-truth set S, the containment-diff ratio is defined as (|Sˆ|−|S|)/|S|. An optimal containment-based match has a containment-diff ratio close to zero. The average containment-diff ratio is computed across all range predicates and IN-clause predicates for all the matched queries.

In some examples, the parameters may not be predictable. For example, because entire query statements are given to a tuning application as part of the workload, values for unpredictable parameters are provided. To address this, a corresponding predicate may be generalized into a catch-all predicate, TRUE. For an example template "SELECT . . . FROM . . . WHERE id=$1 AND age>$2 . . . ", if parameter $1 is unpredictable, its predicate "id=$1" is transformed to "TRUE", with predicted query as "SELECT . . . FROM . . . WHERE TRUE AND age>18 . . . ". By this generalization, the accuracy measurer 242 ensures that a forecasted query with accurate values for all the predictable parameters is a containment-based match to the ground truth.

Referring again to FIG. 9, the illustrated accuracy results 900 illustrate example results of the per-bin models 240 using various settings of Δt, such as one hour, six hours, twelve hours, and twenty-four hours. It should be understood the example time intervals are used for illustration only and should not be construed as limiting. Various examples of time intervals may be used without departing from the scope of the present disclosure. In the example accuracy results 900, the cut and pack algorithm 238 organize templates into bins with a value of k set to 1,000 for workloads 1, 2, and 3 and set to 500 for workload 4. Recall, precision, and F1 scores are measured using the containment-based definition as described herein.

The accuracy results 900 illustrate the forecaster 228 outperforms other forecasting models and maintains stable accuracy across various Δt settings. The non-modified LSTM model and RF perform poorly in workload 4, which includes more outliers and more unstable patterns. For workload 1, the history-based method performs well with the 12-hour interval due to the workload's recurrent queries that have the same parameter values within a day (between the past 12-hour window and the future 12-hour window). However, this method is not effective with the one-day interval, as many query parameter values change when crossing the day boundary. The history-based method yields unsatisfactory results for the other three workloads that exhibit a more rapid and intricate evolution and involve time-related parameters that operate on a finer time scale.

The accuracy results 900 further illustrate that the accuracy of next-Δt forecasting is influenced not only by the model's ability to accurately forecast queries, but also by its ability to accurately forecast arrival times. As the forecasting time window increases, the accuracy of the results changes.

Typically, time-series forecasting with shorter horizons is easier and more accurate. However, predictions for smaller time granularity, such as 1 hour instead of 1 day, tend to be noisier and subject to greater fluctuations in query arrival rates per hour than per day, which makes forecasting arrival 5 hours more challenging than forecasting arrival days. As a result, the majority of forecasting accuracy results with a one-day time window are higher than other time-window settings.

Table 7, presented below, presents training time and 10 model storage overhead for the per-template and per-bin models.

TABLE 7

| | | Training time and model storage overhead for the per-template and per-bin models | | |
|---|---|---|---|---|
| | WL 1 | WL 2 | WL 3 | WL 4 |
| # per-template models | 2157 | 168197 | 258 | 23 |
| Total training time (h) | 119.8 | 9344.3 | 14.3 | 1.3 |
| Total model storage (GB) | 54.0 | 4205.0 | 6.5 | 0.6 |
| # per-bin models | 124 (17.4x) | 7716 (21.8x) | 50 (5.2x) | 1 (23x) |
| Total training time | 11.0 (10.9x) | 685.9 (13.6x) | 4.4 (3.3x) | 0.1 (13.0x) |
| Total model storage (GB) | 12.4 (4.4x) | 771.6 (5.4x) | 5.0 (1.3x) | 0.1 (6.0x) |

As shown above, Table 7 demonstrates the time and storage savings achieved through the implementation of template cutting and packing as well as the per-bin models for next-day forecasting. For example, the average time and storage overhead of a single per-bin model is higher than that of a per-template model due to larger model capacity and a higher average number of queries per bin than per template. However, template cutting and packing significantly reduces the number of total models by up to 23x. Furthermore, employing per-bin models results in a significant reduction in training time of up to 13.6x and storage space by up to 6.0x when compared to per-template models.

Table 7 further demonstrates the trade-off between efficiency and accuracy. Comparing the accuracy results in Table 5 and FIG. 9, the accuracy of per-bin models is slightly lower than per-template models. Because next-Δt forecasting is more challenging than the next-k forecasting, the next-Δt has a higher requirement for the per-bin models to forecast the query arrival time precisely, depending on which we can identify the queries in the next time interval correctly. In contrast to the per-template models, the per-bin models are required to forecast template ids in a bin and more queries in per bin than per template.

FIGS. 10A-10E illustrate example time-evolving patterns and predictability categorization of an internal workload. The example time-evolving patterns and predictability categorization of an internal workloads illustrated in FIGS. 10A-10E are for illustration only and should not be construed as limited. Various examples of the time-evolving patterns and predictability categorization of an internal workloads may be presented without departing from the scope of the present disclosure.

The examples illustrated in FIGS. 10A-10E represent observations of real production workloads as described herein. Based on the observations, the majority of queries come from applications that interact with the underlying data systems in a programmatic way. The applications often submit parameterized queries, e.g., cursor.execute ("SELECT FROM tablename WHERE fieldname=% s", [value]), where the query logic, also referred to herein as the query template, is separated from the parameter values that are being used in a query. Many queries in a workload were observed to share query templates, but with different parameter values. A query is a recurrent query in a workload if the query shares the same query template with at least another query in the workload. As described herein, more than 99.7% of queries in the four observed workloads are recurrent queries. The template of each query in a workload is extracted and the queries are grouped based on the templates. In examples where a template has more than one query in a workload, the template is referred to as a recurrent template. Some workloads are observed to serve one specific application, leading to a small number (e.g., one) of recurrent query templates, whereas other workloads are observed to be used for many applications inside an enterprise system, leading to a large number (e.g., thousands) of recurrent query templates.

As explained above, real workloads can evolve over time. For example, though many queries share the same query template, the parameter values often change with the query arrival time. For a recurrent template in a workload, where the parameter values for the queries belonging to this template change over time, the template is referred to as an evolving template. While a query template may have multiple parameters, as long as one of the parameters exhibits changing behavior, the template is an evolving template. Queries in an evolving template are evolving queries. For example, even though for some observed workloads, the evolving queries may only constitute 25.3% of the recurrent queries, these queries may take roughly 57.4% of the total execution time of the entire workload. In other words, even though the evolving queries only constitute about one fourth of the recurrent queries, the evolving queries are more expensive in the observed workload.

In some examples, the change of values with query arrival time for each parameter is studied and common patterns in the workloads may be observed. Trending patterns, as illustrated in FIG. 10A, may be increasing, decreasing or level trends. Periodic patterns, as illustrates in FIGS. 10B and 10C, may be a regular pattern reoccurs with a fixed interval, such as hourly, daily, weekly, and so forth. In some examples, a combination of both trending and periodic patterns, as illustrated in FIG. 10D, may be present. Further, a random pattern may be present, where there is no regular or predictable pattern, just random variation. These patterns, or lack of, are visualized and illustrated in FIGS. 10A-10E.

FIG. 10A illustrates an increasing pattern of an attribute defined as 'eventdatetime'. The pattern illustrated in FIG. 10A is a trending pattern, where the attribute becomes more prevalent over time. In FIG. 10A, the parameter is a DATE type. It is highly correlated with the query arrival date and increasing over time and is a typical trending pattern.

FIG. 10B illustrates a recurring pattern of an attribute defined as 'source'. The attribute defined as 'source' presents at a recurring pattern over time. FIG. 10B illustrates a periodic pattern having a categorical parameter that only takes three possible values. One default value is queried most of the time, while the other two values are queried infrequently but periodically.

FIG. 10C illustrates a recurring pattern of an attribute defined as 'branch'. The attribute defined as 'branch' presents at a recurring pattern over time, but at a different pattern than the attribute 'source' illustrated in FIG. 10B. In FIG. 10C, the parameter repeats a regular pattern, marked in the box, in a fixed time interval, although there are some occasional outliers. Each of FIGS. 10B and 10C illustrate a periodic pattern, where a similar pattern recurs at a periodic pattern.

FIG. 10D illustrates a recurring and increasing pattern of an attribute defined as 'build'. The pattern illustrated in FIG. 10D illustrates a combination of trending patterns, as illustrated in FIG. 10A, and periodic patterns, as illustrated in FIGS. 10B-10C. This parameter corresponds to a field in the base data that is steadily increasing in value. The workload, on one hand, queries the data with increasing values, but on the other hand periodically looks up old values repeatedly.

FIG. 10E illustrates a recurrent pattern of an attribute defined as 'measureID'. The pattern illustrated in FIG. 10E illustrates a recurrent pattern, which is a random pattern that does not closely match any of a trending pattern, periodic pattern, or combination of trending and periodic patterns. the parameter corresponds to an ID field in the base data. The queries cover a large range of ids, without a clear pattern.

The observations further illustrate that recurrent queries exhibit a high level of predictability. In some examples, the predictability of parameters is categorized into three categories, a trivial-to-predict parameter, a predictable-by-model parameter, and an unpredictable parameter. The trivial-to-predict parameter typically shows a simple pattern, e.g., repeating only a very small number of possible values, thus a naïve strategy is sufficient to forecast such parameters, e.g., a simple heuristic to predict with the historical values. This is illustrated in FIG. 10B. The predictable-by-model parameter is evolving over time and hard to be predicted precisely by the naïve strategies, e.g., heuristic-based or static workload assumption, but quite predictable by ML models. A parameter is empirically defined as predictable if the model prediction accuracy is over 75%. This is illustrated in FIGS. 10A, 10C, and 10D. The unpredictable parameter shows a relative random pattern, where the unpredictable parameters are independent of time and other parameters in the same template. This is illustrated in FIG. 10E. In some examples, based on the observations, it is concluded that it is feasible to learn the evolving patterns and a high portion of the parameters is highly predictable by ML models.

While ad-hoc queries do exist, they appear to make up a small fraction of actual workloads. The majority of queries are recurrent but not static, underscoring the importance of anticipating future workloads to optimize database utilization. Additionally, the predictability of the time-evolving behaviors of these queries makes accurate workload forecasting possible.

FIG. 11 is an example templatization for a query and corresponding template. The example templatization for the query and corresponding template illustrated in FIG. 11 is presented for illustration only and should not be construed as limiting. Various examples of templates and queries may be used without departing from the scope of the present disclosure. In some examples, the templatization illustrated in FIG. 11 is an example of the templatization performed by the pre-processor 106.

FIG. 12 is an example flowchart illustrating a computer-implemented method of forecasting evolving workloads. The computer-implemented method 1200 of FIG. 12 is provided for illustration only and should not be construed as limiting. Other examples of the computer-implemented method 1200 can be used without departing from the scope of the present disclosure. In some examples, the computer-implemented method 1200 is implemented by one or more components of the computing device 202.

The method 1200 begins by the workload forecaster 220 receiving a query in operation 1202. In some examples, the received query is a past query trace. The received query includes one or more parameter values and an arrival time, i.e., a time at which the query is received.

In operation 1204, the workload forecaster 220 determines whether the parameter value or values of the received query are above a similarity threshold of a previous query. In some examples, the similarity threshold is 75% similar to a previous query. However, various examples are possible. In examples where the workload forecaster 220 determines the parameter value or values are within the similarity threshold, the workload forecaster 220 proceeds to operation 1206 and identifies the query as a recurrent query. As a result of identifying the query as a recurrent query, the workload forecaster 220 then extracts a query template from the query in operation 1208. As described herein, the workload forecaster 220 extracts the query template by parsing the query to create an AST and transforms the literals in the AST into parameter markers. In some examples, the workload forecaster 220 groups the queries in the workload based on the extracted query templates. In operations where the parameter value or values are not within the similarity threshold in operation 1204, the workload forecaster 220 proceeds directly to operation 1208 and extracts the query template without identifying the query as a recurrent query.

In operation 1210, the workload forecaster 220 determines whether, for the identified recurrent query, the parameter value or values are the same as previous iterations of the query (e.g., the at least 75 percent similar previous query). In examples where the workload forecaster 220 determines the parameter values are not the same, the workload forecaster 220 proceeds to operation 1212 and identifies the query as an evolving query. For example, different parameter values indicate the query is changing, or evolving, from a previous iteration. In operation 1214, the extracted query template, including the updated parameter values, is updated and used from here on as the template for similar queries. Thus, the evolution of the query is reflected in order to more accurately predict future queries using the template. In some examples, the workload forecaster 220 determines whether a threshold number of changes to the parameter value or values have occurred in the received query relative to previous iterations of the query, in order to avoid making excessive changes to the query templates. Where the threshold number of changes have been made, those parameter values are updated in the extracted query template as described herein. Where the threshold number of changes have been made, the parameter values are not updated in the extracted query template.

In operation 1216, based on either the parameter value being the same in operation 1210 or the query template being updated in operation 1214, the workload forecaster 220 generates a feature vector for the received query. In some examples, the feature vector is a feature representation of the query including a template ID and the parameter values. In some examples, the feature vector is generated for both the received query and its predecessor, i.e., the directly preceding query to the received query.

In operation 1218, the workload forecaster 220 determines a next time interval for queries to forecast. The determined time interval may be referred to herein as a next-Δt time interval. In some examples, the workload forecaster 220 determines the next-time interval as a default interval. In other examples, workload forecaster 220 determines the next-time interval based on feedback received from a previous iteration of workload forecasting. For example, where a previous forecast was determined to be inaccurate and a possible reason for the inaccuracy is too long of a time interval, in operation 1218 selects a shorter next-time interval. In various examples, the determined time interval is one hour, two hours, four hours, twelve hours, twenty-four hours, and so forth.

In operation 1220, the workload forecaster 220 forecasts future queries as a future query workload for the next interval as described herein. In some examples, the forecasted workload includes an x amount of forecasted queries for the determined time interval. In operation 1222, the forecasted query workload is output. In some examples, the forecasted query workload is output, or presented, using the UI 218. In other examples, the forecasted query workload is used by the workload forecaster 220 to allocate computational resources over the given time interval in order to more efficiently respond to or resolve the forecasted queries. Following the forecasted workload being output, the method 1200 terminates.

Example Applications

The forecasting techniques described herein are applicable to multiple real-world applications. In one example, the forecasting is performed for materialized view selection. Workload forecasting may be applied to a classical materialized view selection application by comparing the effectiveness of the selected materialized views based on one-day worth of historical workload vs predicted workload. In one example, a traditional materialized view selection algorithm is used. The forecasting framework described herein is trained using 2237 Workload 4 queries over twenty consecutive days. Then, the view selection algorithm is executed to create materialized views for the subsequent day using two distinct sets of queries: the ones from the preceding day (history trace), and those forecasted by the forecasting framework for the succeeding day (predicted trace). Both runs resulted in a recommendation of 100 different views each. When executed with ground-truth queries using the recommended views on a cloud-based data warehouse (2-compute nodes and 385 GB data), the history-based recommendations covered only 10 of 140 queries, while predicted recommendations covered 83. Materialized views based on predicted queries improved execution time by 1.83×, compared to a modest 1.06× improvement from history-based recommendations, roughly a 1.7× difference.

In another example, the forecasting is performed for semantic caching. Workload forecasting is performed for semantic caching, illustrated by simulating a client-side semantic cache that stores query results. Using Workload 3, the forecasting framework is trained on 75% of the queries. An example experiment included two runs. In the first run, the results of recent queries executed during the previous hour (assuming enough cache capacity to store all the results) were cached, and then ground-truth queries were executed for the subsequent hour. This was repeated for all hours in the testing workload, which included roughly 13K queries per hour. In the second run, the same process was repeated, but instead populated the cache by prefetching results of queries forecasted by the forecasting framework for the subsequent hour. The evaluation demonstrated that the average cache hit rate was 10.6% when the semantic cache was populated using the historical queries. However, when using forecasted queries, the cache hit rate significantly increased to 91.3%, leading to an 8.6× improvement.

Exemplary Operating Environment

Figure 13:
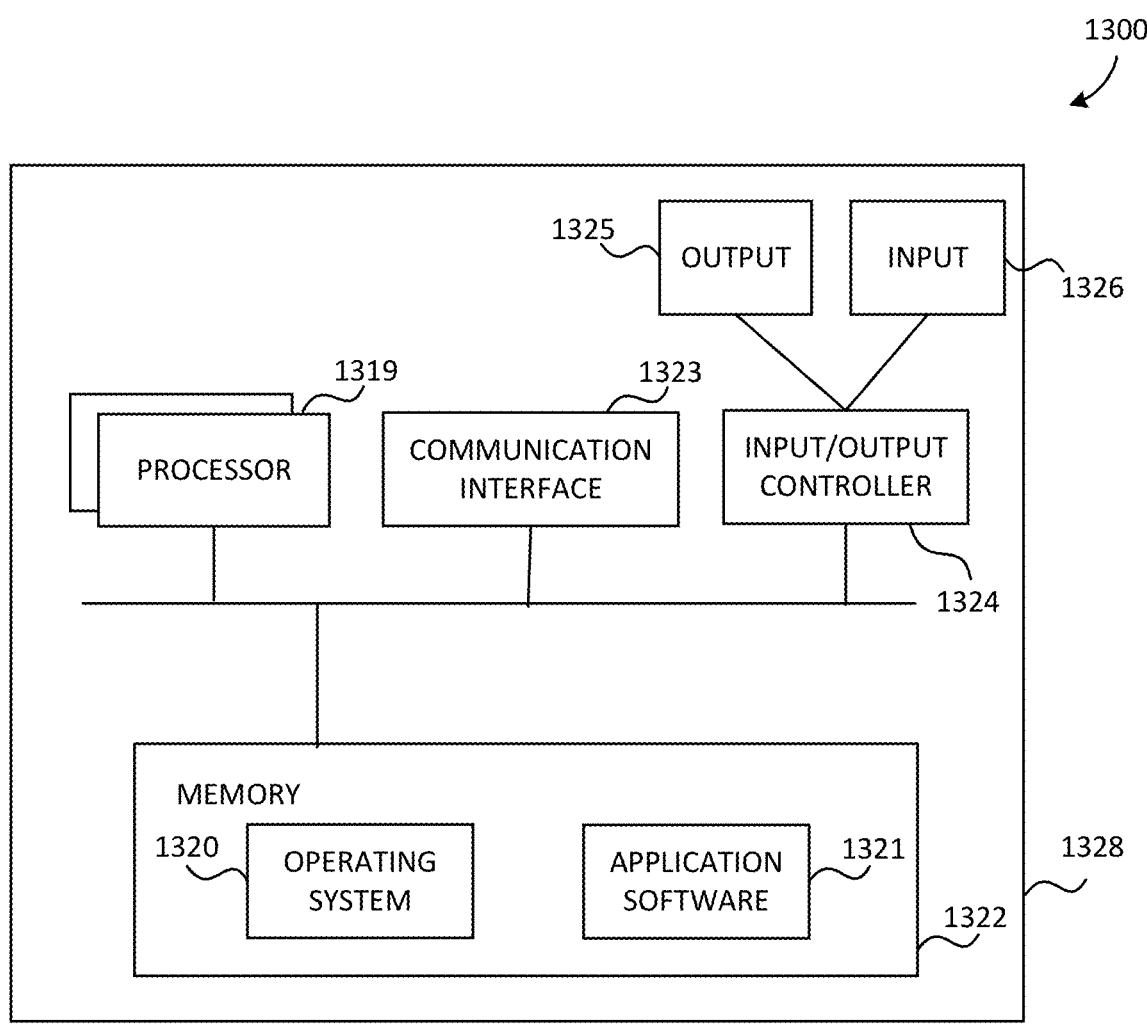
FIG. 13 is a block diagram of an example computing device for implementing examples of the present disclosure.

The present disclosure is operable with a computing apparatus according to an example as a functional block diagram 1300 in FIG. 13. In an example, components of a computing apparatus 1328 may be implemented as a part of an electronic device according to one or more examples described in this specification. For example, the computing apparatus 1328 can be the workload categorizer and forecaster 104 illustrated in FIG. 1 and/or the computing device 202 illustrated in FIG. 2. The computing apparatus 1328 comprises one or more processors 1319 which may be microprocessors, controllers, or any other suitable type of processors for processing computer executable instructions to control the operation of the electronic device. Alternatively, or in addition, the processor 1319 is any technology capable of executing logic or instructions, such as a hard-coded machine. Platform software comprising an operating system 1320 or any other suitable platform software may be provided on the apparatus 1328 to enable application software 1321 to be executed on the device.

Computer executable instructions may be provided using any computer-readable media that are accessible by the computing apparatus 1328. Computer-readable media may include, for example, computer storage media such as a memory 1322 and communications media. Computer storage media, such as a memory 1322, include volatile and non-volatile, removable, and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 1322) is shown within the computing apparatus 1328, it will be appreciated by a person skilled in the art, that the storage may be distributed or located remotely and accessed via a network or other communication link (e.g., using a communication interface 1323).

In some examples, the computer-readable media includes instructions that, when executed by the processor 1319, execute instructions for the workload forecaster 220 and accuracy measurer 242.

The computing apparatus 1328 may comprise an input/output controller 1324 configured to output information to one or more output devices 1325, for example a display or a speaker, which may be separate from or integral to the electronic device. For example, the output device 1325 can be a user interface. The input/output controller 1324 may also be configured to receive and process an input from one or more input devices 1326, for example, a keyboard, a microphone, or a touchpad. In some examples, the one or more input devices 1326 is an input reception module. In one example, the output device 1325 may also act as the input device. An example of such a device may be a touch sensitive display that functions as both the input/output controller 1324. The input/output controller 1324 may also output data to devices other than the output device, e.g., a locally connected printing device. In some examples, a user may provide input to the input device(s) 1326 and/or receive output from the output device(s) 1325.

The functionality described herein can be performed, at least in part, by one or more hardware logic components. According to an example, the computing apparatus 1328 is configured by the program code when executed by the processor 1319 to execute the examples of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an example computing device, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

In examples involving a general-purpose computer, aspects of the disclosure transform the general-purpose computer into a special-purpose computing device when configured to execute the instructions described herein.

An example computer-implemented method for characterizing and forecasting evolving query workloads includes receiving a query, the received query including a parameter value and an arrival time; identifying the query as a recurrent query; extracting a query template from the received query by parsing the received query; based at least on the identifying, generating a feature vector for the received query, the feature vector generated based on the extracted query template and the parameter value; and forecasting a future query based on the generated feature vector by applying a neural network.

An example system for characterizing and forecasting evolving query workloads includes a memory, a processor coupled to the memory, and a workload forecaster, implemented on the processor, that receives a query, the received query including a parameter value and an arrival time, identifies the query as a recurrent query, extracts a query template from the received query by parsing the received query, based at least on the identifying, generates a feature vector for the received query, the feature vector generated based on the extracted query template and the parameter value, and forecasts a future query based on the generated feature vector by applying a neural network.

An example computer-readable medium stores instructions for characterizing and forecasting evolving query workloads that, when executed by a processor, cause the processor to receive a query, the received query including a parameter value and an arrival time; identify the query as a recurrent query; extract a query template from the received query by parsing the received query; generate a feature vector for the received query based on the extracted query template and the parameter value; determine a quantity of future queries to forecast for a next time interval, the quantity of future queries including the forecasted future query; and implement a neural network to: sort the query template into a template bin, and based on the generated feature vector, forecast the future query for the query template in the template bin based on the parameter value included in the query template.

Alternatively, or in addition to the other examples described herein, examples include any combination of the following:

further comprising determining a quantity of future queries to forecast, the quantity of future queries including the forecasted future query;

wherein generating the feature vector further comprises generating a query feature vector and an arrival time feature vector;

further comprising applying a modified long short-term memory network (LSTM) model to forecast the future query;

further comprising determining a next time interval for which to forecast future queries; determining a quantity of the future queries to forecast for the determined next time interval, the quantity of future queries including the forecasted future query, and implementing at least one of a cut and pack algorithm and a per-bin model to forecast the future query;

wherein the cut and pack algorithm sorts a query template into a template bin, and the computer-implemented method further comprises generating the per-bin model based on the parameter value included in the query template in the template bin further comprising forecasting, by the generated per-bin model, the future query for the query template in the template bin based on the parameter value included in the query template;

further comprising determining, by the cut and pack algorithm, that the query template is larger than a threshold number of queries to be forecast, determining a cut point for the query template, cutting, at the determined cut point, the query template into two sub-templates, and sorting each of the two sub-templates into a separate template sub-bin; and further comprising determining an accuracy of the forecasted future query; and based on the determined accuracy of the forecasted future query being below an accuracy threshold, updating a modified long short-term memory network (LSTM) model that forecasts the future query.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one example or may relate to several examples. The examples are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

The invention claimed is:

1. A computer-implemented method comprising:
receiving queries comprising a parameter value;
extracting a query template from each of the queries by parsing the queries;
grouping the queries into a workload based on the query template from each of the queries;

creating a feature representation for each of the queries based on the query template and the parameter value for each of the queries; and forecasting a future workload based on the feature representation for each of the queries.

2. The computer-implemented method of claim 1, further comprising:

re-allocating computational resources based on the forecasting of the future workload.

3. The computer-implemented method of claim 1, further comprising allocating computational resources over a given time interval to efficiently respond to the future workload.

4. The computer-implemented method of claim 1, wherein the given time interval includes a time period in which the future workload is expected.

5. The computer-implemented method of claim 1, wherein creating a feature representation comprises generating a feature vector for a respective query and its predecessor.

6. The computer-implemented method of claim 5, wherein the feature vector is a query feature vector or an arrival-time feature vector.

7. The computer-implemented method of claim 1, wherein parsing the queries comprises parsing each of the queries to create an abstract syntax tree (AST) and transform literals in the AST into parameter markers.

8. The computer-implemented method of claim 1, further comprising:

determining an accuracy of the future workload; and based on the determined accuracy of the future workload being below an accuracy threshold, updating a modified long short-term memory network (LSTM) model that forecasted the future workload.

9. A system comprising:

a memory;

a processor coupled to the memory; and a workload forecaster, implemented on the processor, performs the following operations:

receive queries comprising a parameter value;

extract a query template from each of the queries by parsing the queries;

group the queries into a workload based on the query template from each of the queries;

create a feature representation for each of the queries based on the query template and the parameter value for each of the queries; and forecast a future workload based on the feature representation for each of the queries.

10. The system of claim 9, wherein the workload forecaster further performs the following operations:

re-allocating computational resources based on the forecasting of the future workload.

11. The system of claim 9, wherein the workload forecaster further performs the following operations:

allocating computational resources over a given time interval to efficiently respond to the future workload.

12. The system of claim 9, wherein the given time interval includes a time period in which the future workload is expected.

13. The system of claim 9, wherein creating a feature representation comprises generating a feature vector for a respective query and its predecessor.

14. The system of claim 13, wherein the feature vector is a query feature vector or an arrival-time feature vector.

15. The system of claim 13, wherein parsing the queries comprises parsing each of the queries to create an abstract syntax tree (AST) and transform literals in the AST into parameter markers.

16. The system of claim 14, wherein the workload forecaster further performs the following operations:

determining an accuracy of the future workload; and based on the determined accuracy of the future workload being below an accuracy threshold, updating a modified long short-term memory network (LSTM) model that forecasted the future workload.

17. A computer-storage medium storing instructions that, when executed by a processor, cause the processor to perform the following operations:

receiving queries comprising a parameter value;

extracting a query template from each of the queries by parsing the queries;

grouping the queries into a workload based on the query template from each of the queries;

creating a feature representation for each of the queries based on the query template and the parameter value for each of the queries; and forecasting a future workload based on the feature representation for each of the queries.

18. The computer-storage medium of claim 17, wherein the instructions further cause the processor to perform the following operations:

re-allocating computational resources based on the forecasting of the future workload.

19. The computer-storage medium of claim 17, wherein the instructions further cause the processor to perform the following operations:

allocating computational resources over a given time interval to efficiently respond to the future workload.

20. The computer-storage medium of claim 17, wherein parsing the queries comprises parsing each of the queries to create an abstract syntax tree (AST) and transform literals in the AST into parameter markers.

* * * * *